United States Patent
Sekizawa et al.

(10) Patent No.: US 11,550,626 B2
(45) Date of Patent: Jan. 10, 2023

(54) INFORMATION PROCESSING APPARATUS, JOB SCHEDULING METHOD, AND NON-TRANSITORY COMPUTER-READABLE STORAGE MEDIUM

(71) Applicant: FUJITSU LIMITED, Kawasaki (JP)

(72) Inventors: Ryuichi Sekizawa, Kobe (JP); Shigeto Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 17/073,489

(22) Filed: Oct. 19, 2020

(65) Prior Publication Data

US 2021/0141667 A1    May 13, 2021

(30) Foreign Application Priority Data

Nov. 12, 2019  (JP) .............................. JP2019-204385

(51) Int. Cl.
   *G06F 9/48*    (2006.01)
   *G06F 9/38*    (2018.01)
   *G06F 9/54*    (2006.01)

(52) U.S. Cl.
   CPC .......... *G06F 9/4881* (2013.01); *G06F 9/3855* (2013.01); *G06F 9/54* (2013.01)

(58) Field of Classification Search
   None
   See application file for complete search history.

(56) References Cited

U.S. PATENT DOCUMENTS

| | | | |
|---|---|---|---|
| 7,793,294 B2* | 9/2010 | Haeri | G06F 9/4887 |
| | | | 718/103 |
| 2013/0074088 A1* | 3/2013 | Purcell | G06F 9/461 |
| | | | 718/103 |
| 2017/0024247 A1* | 1/2017 | Evripidou | G06F 9/4881 |
| 2017/0083378 A1* | 3/2017 | Bishop | G06F 9/5038 |
| 2017/0123947 A1* | 5/2017 | Baptist | H04L 43/0864 |
| 2017/0199798 A1* | 7/2017 | Jain | G06F 11/3024 |

(Continued)

FOREIGN PATENT DOCUMENTS

JP    H08-106369 A    4/1996

OTHER PUBLICATIONS

Extended European Search Report dated Mar. 25, 2021 for corresponding European Patent Application No. 20203310.6, 8 pages.

(Continued)

*Primary Examiner* — Hyun Nam
(74) *Attorney, Agent, or Firm* — Fujitsu Patent Center

(57) ABSTRACT

An information processing apparatus includes a memory and a processor couple to the memory and configured to generate one or more job groups by grouping multiple jobs of execution targets in descending order of priority, and perform a control for scheduling execution timings regarding the multiple jobs such that scheduling of respective jobs included in a specific job group including a job having a higher priority is implemented by priority over scheduling of respective jobs included in other job groups. The processor performs the control for scheduling the execution timings of the respective jobs included in the specific job group such that an execution completion time of all the jobs included in the specific job group satisfies a predetermined condition.

12 Claims, 28 Drawing Sheets

(56) References Cited

U.S. PATENT DOCUMENTS

| | | | | |
|---|---|---|---|---|
| 2017/0213171 | A1* | 7/2017 | Dubash | G06Q 10/06314 |
| 2018/0321979 | A1* | 11/2018 | Bahramshahry | G06F 9/4881 |
| 2018/0336065 | A1* | 11/2018 | Martin | G06F 9/5038 |
| 2018/0349180 | A1* | 12/2018 | Nakada | G06F 9/4881 |
| 2020/0250787 | A1* | 8/2020 | Cheng | G06F 9/4881 |
| 2020/0272512 | A1* | 8/2020 | Rohleder | G06F 9/542 |

OTHER PUBLICATIONS

European Office Action dated May 12, 2022 for corresponding European Patent Application No. 20203310.6, 6 pages.

* cited by examiner

FIG. 14

| ITEM NUMBER | JOB NAME | NODE NUMBER | EXECUTION TIME (MINUTE) | ACCEPTED TIME |
|---|---|---|---|---|
| 1 | JOB-A2 | 20 | 20 | 11:12 |
| 2 | JOB-C5 | 60 | 20 | 11:15 |
| 3 | JOB-D1 | 40 | 30 | 11:16 |
| 4 | JOB-A8 | 60 | 10 | 11:21 |
| 5 | JOB-A6 | 20 | 10 | 11:22 |
| 6 | JOB-D5 | 40 | 10 | 11:25 |
| 7 | JOB-C3 | 100 | 10 | 11:28 |
| 8 | JOB-B3 | 80 | 10 | 11:36 |
| 9 | JOB-D9 | 80 | 30 | 11:41 |
| 10 | JOB-C2 | 60 | 20 | 11:45 |

FIG. 15

| ITEM NUMBER | JOB NAME | EXECUTION NODE | EXECUTION START TIME | EXECUTION END TIME |
|---|---|---|---|---|
| 1 | JOB-A4 | N1-N40 | 11:40 | 12:00 |
| 2 | JOB-B2 | N41-N80 | 11:50 | 12:00 |
| 3 | JOB-A7 | N81-N100 | 11:20 | 12:00 |

FIG. 16

| ITEM NUMBER | JOB NAME | JOB GROUP NAME |
|---|---|---|
| 1 | JOB-A2 | G1 |
| 2 | JOB-C5 | G1 |
| 3 | JOB-D1 | G1 |
| 4 | JOB-A8 | G2 |
| 5 | JOB-A6 | G2 |
| 6 | JOB-D5 | G2 |
| 7 | JOB-C3 | G3 |
| 8 | JOB-B3 | G3 |
| 9 | JOB-D9 | G3 |
| 10 | JOB-C2 | G4 |

FIG. 19

| ITEM NUMBER | JOB NAME | EXECUTION NODE | EXECUTION START TIME | EXECUTION END TIME |
|---|---|---|---|---|
| 1 | JOB-A2 | N1-N20 | 12:20 | 12:40 |
| 2 | JOB-C5 | N1-N60 | 12:00 | 12:20 |
| 3 | JOB-D1 | N61-N100 | 12:00 | 12:30 |

FIG. 21

| ITEM NUMBER | JOB NAME | EXECUTION NODE | EXECUTION START TIME | EXECUTION END TIME |
|---|---|---|---|---|
| 1 | JOB-A2 | N1-N20 | 12:20 | 12:40 |
| 2 | JOB-C5 | N1-N60 | 12:00 | 12:20 |
| 3 | JOB-D1 | N61-N100 | 12:00 | 12:30 |
| 4 | JOB-A8 | N21-N80 | 12:30 | 12:40 |
| 5 | JOB-A6 | N81-N100 | 12:30 | 12:40 |
| 6 | JOB-D5 | N21-N60 | 12:20 | 12:30 |

FIG. 23

| ITEM NUMBER | JOB NAME | EXECUTION NODE | EXECUTION START TIME | EXECUTION END TIME |
|---|---|---|---|---|
| 1 | JOB-A2 | N1-N20 | 12:20 | 12:40 |
| 2 | JOB-C5 | N1-N60 | 12:00 | 12:20 |
| 3 | JOB-D1 | N61-N100 | 12:00 | 12:30 |
| 4 | JOB-A8 | N21-N80 | 12:30 | 12:40 |
| 5 | JOB-A6 | N81-N100 | 12:30 | 12:40 |
| 6 | JOB-D5 | N21-N60 | 12:20 | 12:30 |
| 7 | JOB-C3 | N1-N100 | 12:40 | 12:50 |
| 8 | JOB-B3 | N1-N80 | 12:50 | 13:00 |
| 9 | JOB-D9 | N1-N80 | 13:00 | 13:30 |

FIG. 25

| ITEM NUMBER | JOB NAME | EXECUTION NODE | EXECUTION START TIME | EXECUTION END TIME |
|---|---|---|---|---|
| 1 | JOB-A2 | N1-N20 | 12:20 | 12:40 |
| 2 | JOB-C5 | N1-N60 | 12:00 | 12:20 |
| 3 | JOB-D1 | N61-N100 | 12:00 | 12:30 |
| 4 | JOB-A8 | N21-N80 | 12:30 | 12:40 |
| 5 | JOB-A6 | N81-N100 | 12:30 | 12:40 |
| 6 | JOB-D5 | N21-N60 | 12:20 | 12:30 |
| 7 | JOB-C3 | N1-N100 | 12:40 | 12:50 |
| 8 | JOB-B3 | N1-N80 | 12:50 | 13:00 |
| 9 | JOB-D9 | N1-N80 | 13:00 | 13:30 |
| 10 | JOB-C2 | N1-N60 | 13:30 | 13:50 |

FIG. 26

| ITEM NUMBER | JOB NAME | NODE NUMBER | EXECUTION TIME (MINUTE) | ACCEPTED TIME |
|---|---|---|---|---|
| 1 | JOB-A2 | 20 | 20 | 11:12 |
| 4 | JOB-A8 | 60 | 10 | 11:21 |
| 5 | JOB-A6 | 20 | 10 | 11:22 |
| 6 | JOB-D5 | 40 | 10 | 11:25 |
| 7 | JOB-C3 | 100 | 10 | 11:28 |
| 8 | JOB-B3 | 80 | 10 | 11:36 |
| 9 | JOB-D9 | 80 | 30 | 11:41 |
| 10 | JOB-C2 | 60 | 20 | 11:45 |
| 11 | JOB-E1 | 60 | 10 | 12:00 |
| 12 | JOB-E2 | 20 | 20 | 12:01 |

FIG. 27

| ITEM NUMBER | JOB NAME | EXECUTION NODE | EXECUTION START TIME | EXECUTION END TIME |
|---|---|---|---|---|
| 1 | JOB-C5 | N1-N60 | 12:00 | 12:30 |
| 2 | JOB-D1 | N61-N100 | 12:00 | 12:30 |

INFORMATION PROCESSING APPARATUS, JOB SCHEDULING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2019-204385, filed on Nov. 12, 2019, the entire contents of which are incorporated herein by reference.

FIELD

The embodiment discussed herein is related to an information processing apparatus, a job scheduling method, and a non-transitory computer-readable storage medium.

BACKGROUND

For example, a business operator who provides a service to a user (hereinafter, simply also referred to as a business operator) constructs a business system used for providing the service. The business operator operates a job scheduler configured to determine execution times of respective jobs and the like in the aforementioned business system, for example.

Specifically, when a new job is input, the job scheduler specifies nodes that may execute the new job based on information such as job execution statuses in the respective nodes. The job scheduler instructs any of the specified nodes to execute the new job (for example, see Japanese Laid-open Patent Publication No. 8-106369).

Related technique is disclosed in for example Japanese Laid-open Patent Publication No. 8-106369.

SUMMARY

According to an aspect of the embodiments, an information processing apparatus includes a memory and a processor couple to the memory and configured to: generate one or more job groups by grouping multiple jobs of execution targets in descending order of priority, and perform a control for scheduling execution timings regarding the multiple jobs such that scheduling of respective jobs included in a specific job group including a job having a higher priority is implemented by priority over scheduling of respective jobs included in other job groups, the processor performs the control for scheduling the execution timings of the respective jobs included in the specific job group such that an execution completion time of all the jobs included in the specific job group satisfies a predetermined condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a drawing for describing a specific example of job queue information 132;

FIG. 15 is a drawing for describing a specific example of job status information 133;

FIG. 16 is a drawing for describing a specific example of job group information 134;

FIG. 19 is a drawing for describing a specific example of schedule information 136;

FIG. 21 is a drawing for describing the specific example of the schedule information 136;

FIG. 23 is a drawing for describing a specific example of schedule information 136;

FIG. 25 is a drawing for describing the specific example of e schedule information 136;

FIG. 26 is a drawing for describing the specific example of the job queue information 132;

FIG. 27 is a drawing for describing the specific example of the job status information 133.

DESCRIPTION OF EMBODIMENTS

In the rerated art, when multiple new jobs are input, for example, the job scheduler schedules execution timings of the respective jobs such that execution orders of the respective jobs conform to priorities of the respective jobs.

However, when the number of nodes used for executing the respective jobs and execution times of the respective jobs vary, for example, the job scheduler does not generate a schedule in which resources of the respective nodes may be efficiently used, and an end timing at which all the jobs are executed may be delayed.

In view of the above, for example, the job scheduler schedules the execution timings of the respective jobs such that the resources of the respective nodes are used as efficiently as possible. Thus, the job scheduler may suppress the delay of the execution end timing of all the jobs.

However, in this case, an execution timing of a job having a high priority (for example, a job that has been input early) may be much delayed, and adopted system conditions may not be satisfied.

In view of the above, according to one aspect, the present disclosure aims at providing a job scheduling program with which respective jobs are efficiently executed while a delay of an execution timing of a job having a high priority is suppressed, an information processing apparatus, and a job scheduling method.

[Configuration of Information Processing System]

Figure 1:
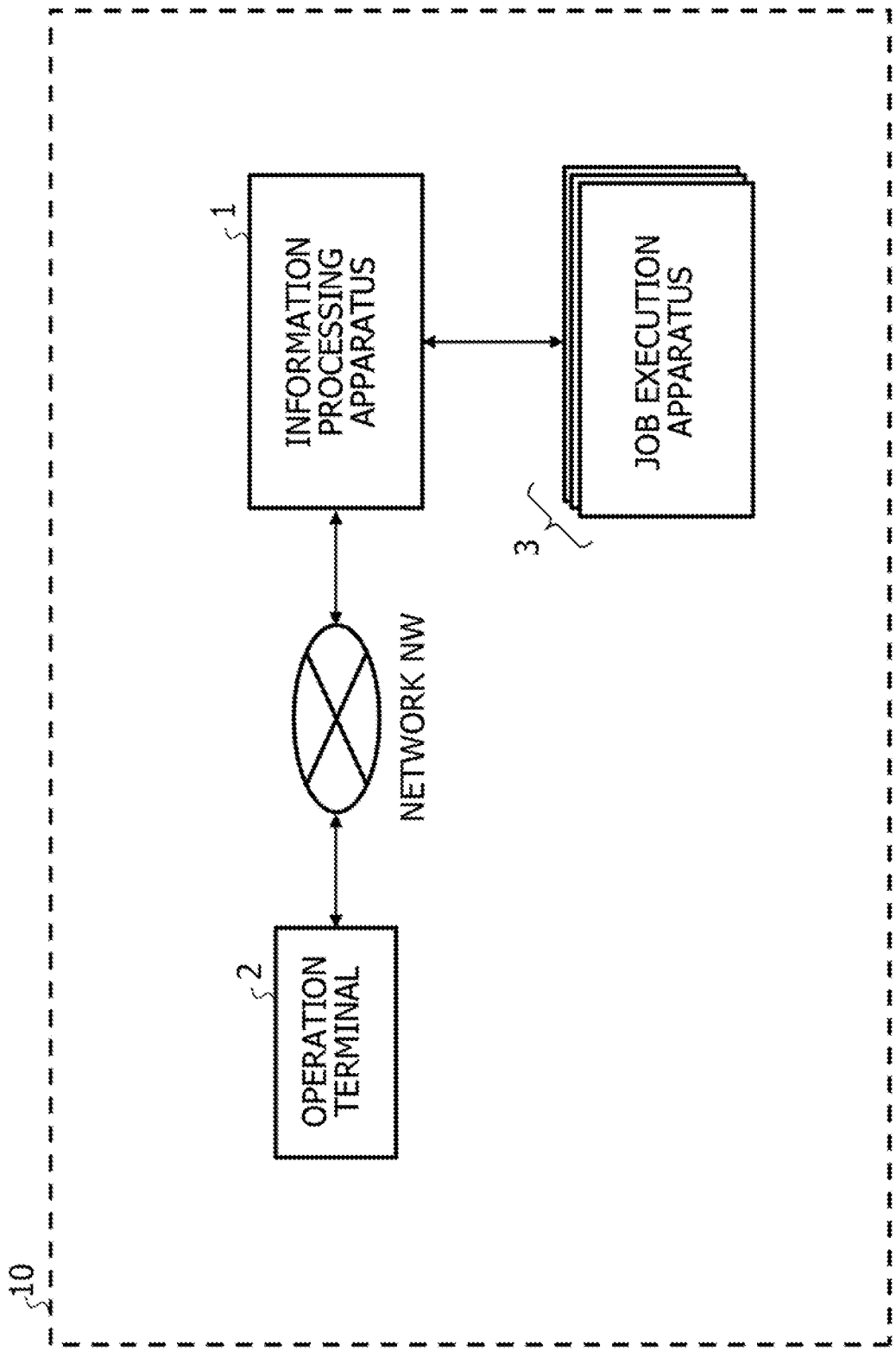
FIG. 1 is a drawing for describing a configuration of an information processing system 10.

A configuration of an information processing system 10 will be described first. FIG. 1 is a drawing for describing a configuration of an information processing system 10.

The information processing system 10 includes an information processing apparatus 1 in which a job scheduler that schedules execution timings of jobs operates, and an operation terminal 2 used by a business operator to perform adopted operations. The information processing system 10 also includes a job execution apparatus 3 that executes the jobs in accordance with the scheduling performed by the information processing apparatus 1.

The job execution apparatus 3 is an apparatus constituted by multiple nodes (multiple physical machines), and is a high performance computing (HPC) system, for example. The operation terminal 2 is a terminal that may access the information processing apparatus 1 via a network NW such as the Internet.

In an example illustrated in FIG. 1, the business operator inputs the number of nodes used for executing respective jobs and execution times of the respective jobs to the information processing apparatus 1 via the operation terminal 2. The information processing apparatus 1 generates information indicating a schedule of execution timings of the respective jobs (hereinafter, also referred to as schedule information) based on respective information input from the operation terminal 2, and transmits the information to the job execution apparatus 3. Thereafter, the job execution apparatus 3 executes the respective jobs in accordance with the schedule information transmitted from the information processing apparatus 1. Hereinafter, the scheduling of the respective jobs, which is performed in the information processing apparatus 1, will be described.

[Specific Example of Job Scheduling]

Figure 2:
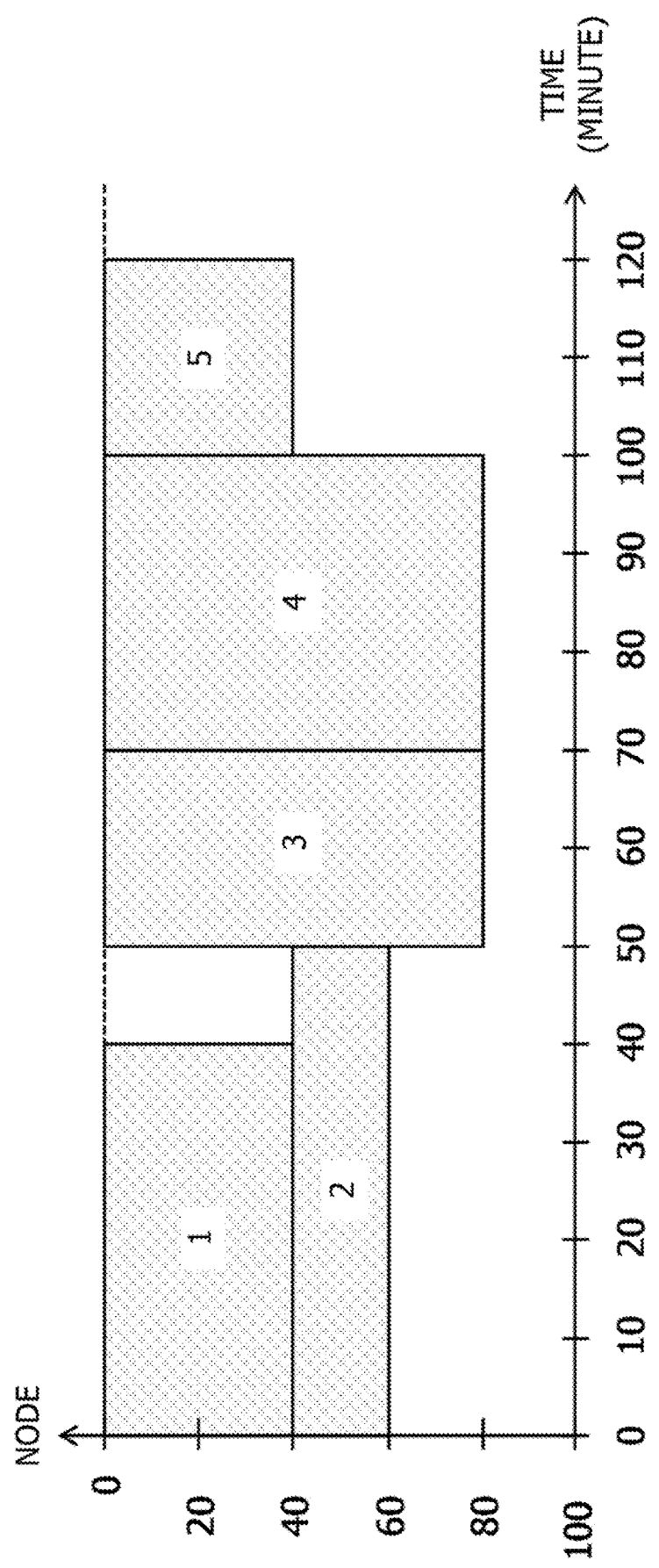
FIG. 2 is a drawing for describing a specific example of scheduling of respective jobs.
Figure 3:
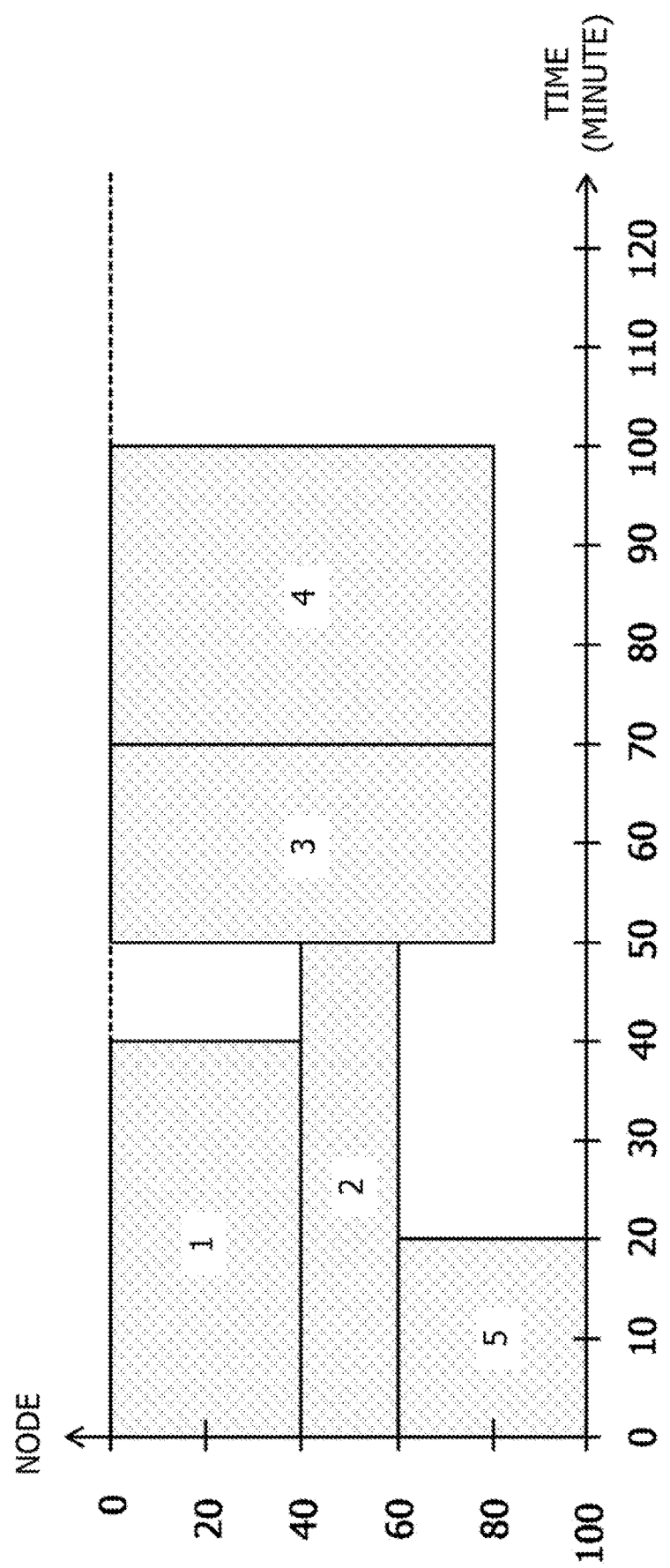
FIG. 3 is a drawing for describing the specific example of the scheduling of the respective jobs.
Figure 4:
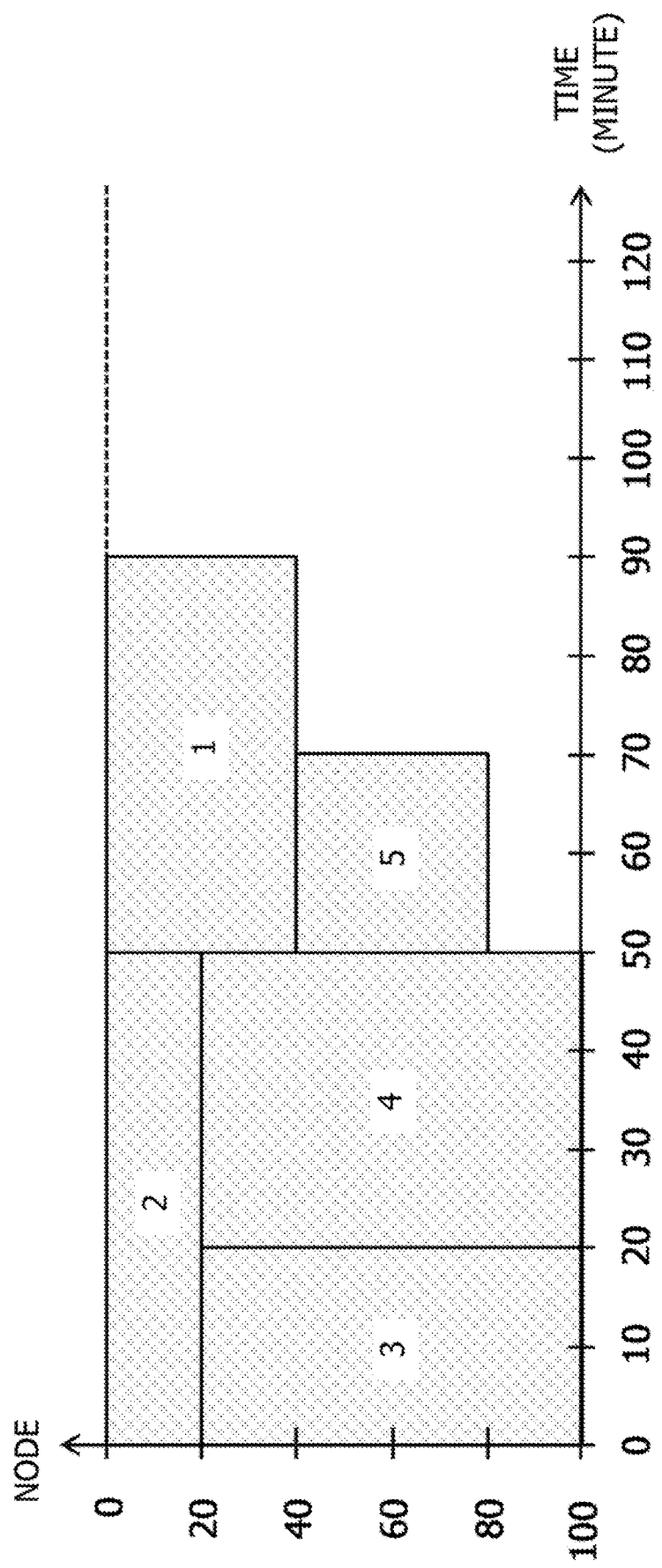
FIG. 4 is a drawing for describing the specific example of the scheduling of the respective jobs.

FIGS. 2 to 4 are drawings for describing a specific example of the scheduling of the respective jobs. A vertical axis and a horizontal axis in the example illustrated in FIGS. 2 to 4 respectively represent a time and an identification number of the node. Numbers of the respective jobs in the example illustrated in FIGS. 2 to 4 indicate priorities of the respective jobs.

Specifically, for example, FIGS. 2 to 4 are drawings for describing the scheduling of a job having a priority of "1" (hereinafter, also referred to as a job 1), a job having a priority of "2" (hereinafter, also referred to as a job 2), a job having a priority of "3" (hereinafter, also referred to as a job 3), a job having a priority of "4" (hereinafter, also referred to as a job 4), and a job having a priority of "5" (hereinafter, also referred to as a job 5).

In the example illustrated in FIGS. 2 to 4, descriptions will be provided while the number of nodes used for executing the job 1 and the execution time are respectively "40 (nodes)" and "40 (minutes)", the number of nodes used for executing the job 2 and the execution time are respectively "20 (nodes)" and "50 (minutes)", the number of nodes used for executing the job 3 and the execution time are respectively "80 (nodes)" and "20 (minutes)", the number of nodes used for executing the job 4 and the execution time are respectively "80 (nodes)" and "30 (minutes)", and the number of nodes used for executing the job 5 and the execution time are respectively "40 (nodes)" and "20 (minutes)". Hereinafter, descriptions will be provided while the job having the lower priority value is executed by priority over the other jobs. Hereinafter, descriptions will be provided while the number of jobs assigned in the job execution apparatus 3 is 100 (nodes).

[Scheduling at 0 (minutes)]

First, the job scheduling at a timing when the time is "0 (minutes)" will be described.

First, the information processing apparatus 1 (job scheduler) specifies that the number of nodes included in the job execution apparatus 3 is "100 (nodes)", and also the number of nodes used for executing the job 1 is "40 (nodes)". For this reason, the information processing apparatus 1 determines that the job 1 may be executed from the beginning.

Next, the information processing apparatus 1 specifies that the number of nodes that do not execute the job is "60 (nodes)" when the job 1 is executed, and also the number of nodes used for executing the job 2 is "20 (nodes)". For this reason, the information processing apparatus 1 determines that the job 2 may also be executed from the beginning together with the job 1.

Subsequently, the information processing apparatus 1 specifies that the number of nodes that do not execute the job is "40 (nodes)" when the jobs 1 and 2 are executed, and also the number of nodes used for executing the job 3 is "80 (nodes)". For this reason, the information processing apparatus 1 determines that the job 3 is not executed together with the jobs 1 and 2.

Therefore, as illustrated in FIG. 2, for example, the information processing apparatus 1 determines that at the timing when the time is "0 (minutes)" (first timing), the job 1 is executed using 40 (nodes) of the node numbers from "1" to "40", and also the job 2 is executed using 20 (nodes) of the node numbers from "41" to "60".

[Scheduling at 40 (minutes)]

Next, the job scheduling at a timing when the time is "40 (minutes)" (timing when the execution of the job 1 is ended) will be described.

The information processing apparatus 1 specifies that the number of nodes that do not execute the job is "60 (nodes)" when the execution of the job 1 is ended at the timing when the time is "40 (minutes)", and also the number of nodes used for executing the job 3 is "80 (nodes)".

For this reason, as illustrated in FIG. 2, for example, the information processing apparatus 1 determines that the job 3 is not executed at the timing when the time is "40 (minutes)".

[Scheduling at 50 (minutes)]

Next, the job scheduling at a timing when the time is "50 (minutes)" (timing when the execution of the job 2 is ended) will be described.

The information processing apparatus 1 specifies that the number of nodes that do not execute the job is "100 (nodes)" when the execution of the job 2 is ended at the timing when the time is "50 (minutes)", and also the number of nodes used for executing the job 3 is "80 (nodes)".

For this reason, as illustrated in FIG. 2, for example, the information processing apparatus 1 determines that the job 3 is executed using 80 (nodes) of the node numbers from "1" to "80" at the timing when the time is "50 (minutes)".

[Scheduling at 70 (minutes)]

Next, the job scheduling at a timing when the time is "70 minutes)" (timing when the execution of the job 3 is ended) will be described.

The information processing apparatus 1 specifies that the number of nodes that do not execute the job is "100 (nodes)" when the execution of the job 3 is ended at the timing when the time is "70 (minutes)", and &so the number of nodes used for executing the job 4 is "80 (nodes)".

For this reason, as illustrated in FIG. 2, for example, the information processing apparatus 1 determines that the job 4 is executed using 80 (nodes) of the node numbers from "1" to "80" at the timing when the time is "70 (minutes)".

[Scheduling at 100 (minutes)]

Next, the job scheduling at a timing when the time is "100 (minutes)" (timing when the execution of the job 4 is ended) will be described.

The information processing apparatus 1 specifies that the number of nodes that do not execute the job is "100 (nodes)" when the execution of the job 4 is ended at the timing when the time is "100 (minutes)", and also the number of nodes used for executing the job 5 is "40 (nodes)".

For this reason, as illustrated in FIG. 2, for example, the information processing apparatus 1 determines that the job 5 is executed using 40 (nodes) of the node numbers from "1" to "40" at the timing when the time is "100 (minutes)".

For example, the example illustrated in FIG. 2 indicates a case where the execution of the respective jobs 1 to 5 takes 120 (minutes).

For example, when a time slot when the job having the high priority is not executed but the job having the low priority may be executed exists, the information processing apparatus 1 may execute the job having the low priority earlier than the job having the high priority.

Specifically, for example, in the example illustrated in FIG. 2, when the jobs 1 and 2 are executed, the number of nodes that do not execute the job is "40 (nodes)", and the number of nodes used for executing the job 5 is "20 (nodes)". For this reason, as illustrated in FIG. 3, the information processing apparatus 1 may determine that the jobs 1, 2, and 5 are executed at the timing when the time is "0 (minutes)".

For example, the information processing apparatus 1 may efficiently execute the respective jobs by adopting a method illustrated in FIG. 3 (hereinafter, also referred to as a related-art method) as compared with the case described with reference to FIG. 2.

However, in the example illustrated in FIG. 2 or 3, when the numbers of nodes used for executing the respective jobs and the execution times of the respective jobs much vary, the information processing apparatus 1 does not generate a schedule in which the resources of the respective nodes may be efficiently used, and the execution end timing of all the jobs may be delayed.

In view of the above, as illustrated in FIG. 4, for example, the information processing apparatus 1 schedules the execution timings of the respective jobs such that the resources of the respective nodes are used as efficiently as possible. Thus, the information processing apparatus 1 may suppress the delay of the execution end timing of all the jobs.

However, in this case, as illustrated in FIG. 4, the execution timing of the job 1 that has been input early may be much delayed in some cases, and adopted system conditions may not be satisfied.

In view of the above, the information processing apparatus 1 according to the present embodiment generates one or more job groups by grouping multiple jobs of execution targets in descending order of the priority. The information processing apparatus 1 schedules the execution timings regarding the multiple jobs such that scheduling of respective jobs included in the job group including the job having the higher priority (hereinafter, also referred to as a specific job group) is implemented by priority over scheduling of respective jobs included in the other job groups. In this case, the information processing apparatus 1 schedules the execution timings regarding the respective jobs included in the specific job group such that an execution completion time of all the jobs included in the specific job group satisfies a predetermined condition.

For example, the information processing apparatus 1 performs the scheduling without taking into account the priority in a relationship between the jobs included in the same job group while the respective jobs included in the job group including the job having the high priority are prioritized over the respective jobs included in the other job groups.

Thus, the information processing apparatus 1 may schedule the execution timings of the respective jobs such that both avoiding of the delay in the execution timing of the job having the high priority and efficient execution of the respective jobs are achieved.

[Hardware Configuration of Information Processing System]

Figure 5:
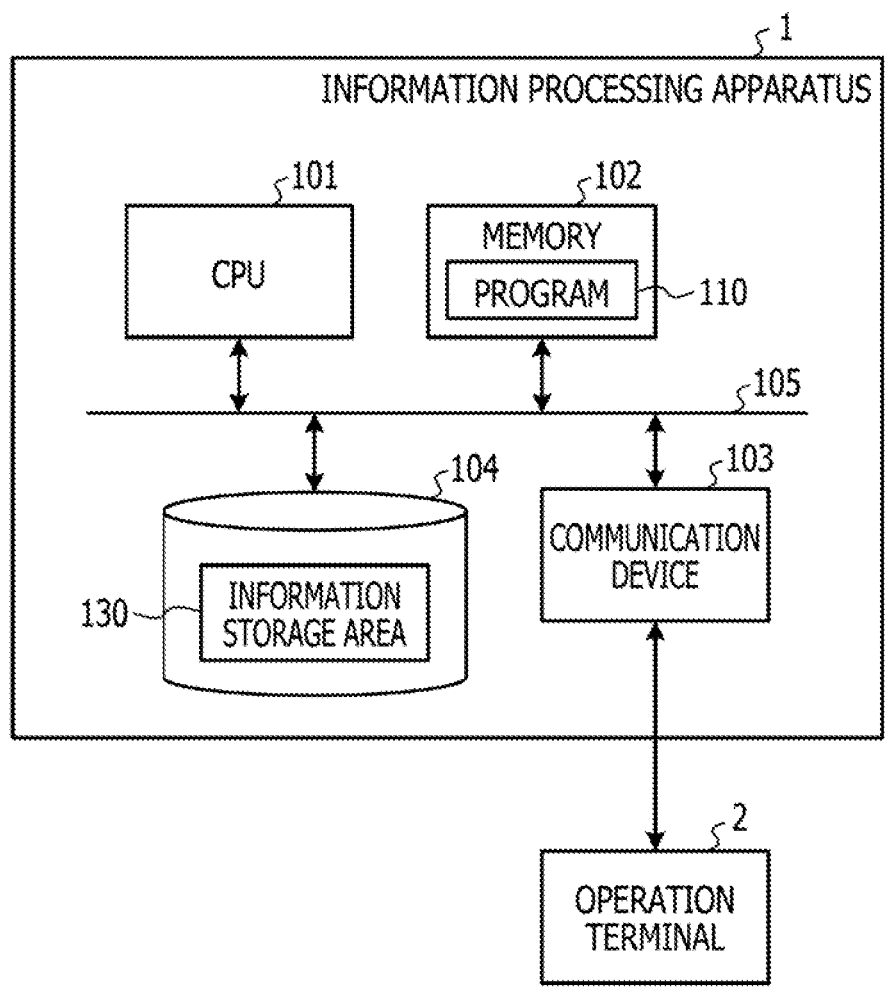
FIG. 5 is a drawing for describing a hardware configuration of an information processing apparatus 1.

Next, a hardware configuration of the information processing system 10 will be described. FIG. 5 is a drawing for describing a hardware configuration of an information processing apparatus 1.

As illustrated in FIG. 5, the information processing apparatus 1 includes a CPU 101 serving as a processor, a memory 102, a communication device 103, and a storage medium 104. These components are coupled to one another via a bus 105.

The storage medium 104 includes, for example, a program storage area (not illustrated) that stores a program 110 for performing processing of scheduling job execution timings (hereinafter, also referred to as job scheduling processing). The storage medium 104 also includes, for example, a storage unit 130 (hereinafter, also referred to as an information storage area 130) that stores information used when the job scheduling processing is performed. The storage medium 104 may be a hard disk drive (HDD) or a solid-state drive (SSD), for example.

The CPU 101 executes the program 110 loaded from the storage medium 104 to the memory 102 to perform the job scheduling processing.

The communication device 103 performs communication with the operation terminal 2 via the network NW, for example.

[Functions of Information Processing System]

Figure 6:
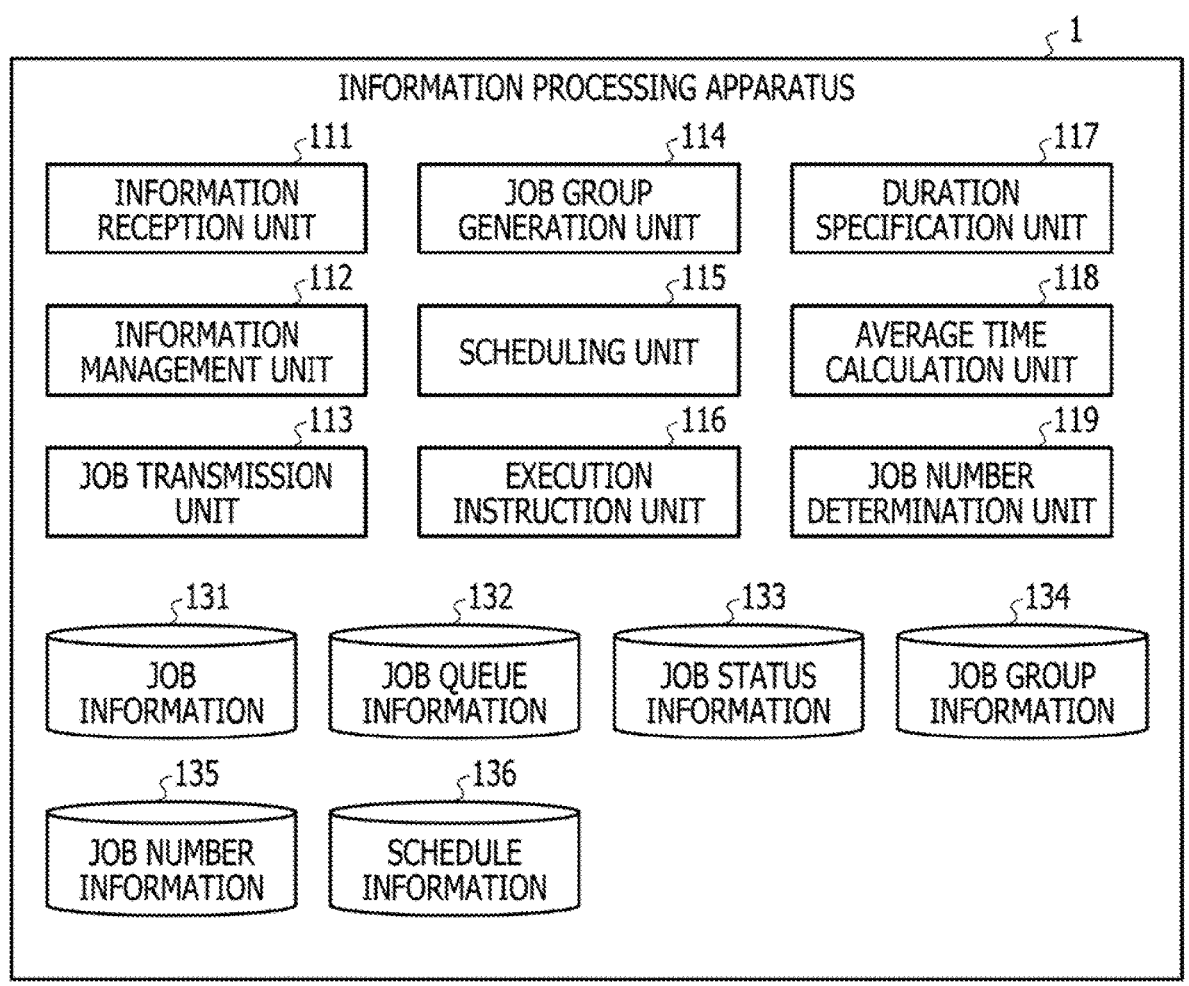
FIG. 6 is a functional block drawing of the information processing apparatus 1.

Next, functions of the information processing system 10 will be described. FIG. 6 is a functional block drawing of the information processing apparatus 1.

As illustrated in FIG. 6, for example, when hardware such as the CPU 101 and the memory 102 and the program 110 organically cooperate with each other, the information processing apparatus 1 realizes various functions including an information reception unit 111, an information management unit 112, an job transmission unit 113, a job group generation unit 114, a scheduling unit 115, an execution instruction unit 116, a duration specification unit 117, an average time calculation unit 118, and a job number determination unit 119.

For example, as illustrated in FIG. 6, the information processing apparatus 1 stores job information 131, job queue information 132, job status information 133, job group information 134, job number information 135, and schedule information 136 in the information storage area 130.

The information reception unit 111 receives a job input by the business operator via the operation terminal 2, for example. The information reception unit 111 also receives, for example, various information input by the business operator via the operation terminal 2. Specifically, for example, the information reception unit 111 receives information indicating the number of nodes used for executing the respective jobs, and information indicating the execution times of the respective jobs (hereinafter, these are also collectively referred to as job information 131).

The information management unit 112 stores the job information 131 received by the information reception unit 111 in the information storage area 130. The information management unit 112 generates the job queue information 132 indicating the priority of the job received by the information reception unit 111 (for example, an input order of the job to the information processing apparatus 1), and stores the information in the information storage area 130.

The information management unit 112 generates the job status information 133 indicating execution statuses of the respective jobs, and stores the job status information 133 in the information storage area 130. Specifically, for example, when execution start of a new job is detected, the information management unit 112 generates the job status information 133 indicating that effect, and stores the information in the information storage area 130. For example, when execution end of the job is detected, the information management unit 112 generates the job status information 133 indicating that effect, and stores the job status information 133 in the information storage area 130.

For example, the job transmission unit 113 transmits the job received by the information reception unit 111 to the job execution apparatus 3.

The job group generation unit 114 generates one or more job groups by grouping the respective jobs received by the information reception unit 111 in descending order of the priority. Specifically, for example, the job group generation unit 114 generates one or more job groups by grouping the respective jobs received by the information reception unit 111 in descending order of the input order. The information management unit 112 generates the job group information 134 indicating the one or more job groups generated by the job group generation unit 114, and stores the job group information 134 in the information storage area 130.

For example, the job group generation unit 114 may generate one or more job groups by referring to the job queue information 132 and the job number information 135 stored in the information storage area 130, and grouping jobs each information of which is included in the job queue information 132 into sets of the same number of jobs as the number indicated by the job number information 135.

The scheduling unit 115 schedules the execution timings of the respective jobs received by the information reception unit 111 such that the scheduling of the respective jobs included in the specific job group including the job having the higher priority is implemented by priority aver the scheduling of the respective jobs included in the other job groups.

In this case, the scheduling unit 115 schedules the execution timings of the respective jobs included in the specific job group such that the execution completion time of all the jobs included in the specific job group satisfies the predetermined condition. Specifically, for example, the scheduling unit 115 specifies a schedule in which the execution completion time of all the jobs included in the respective job groups is the earliest as the schedule regarding the respective jobs included in the respective job groups. The information management unit 112 generates the schedule information 136 indicating the schedule specified by the scheduling unit 115, and stores the schedule information 136 in the information storage area 130.

The execution instruction unit 116 transmits the schedule information 136 stored in the information storage area 130 to the job execution apparatus 3.

The duration specification unit 117 refers to the job status information 133 stored in the information storage area 130, and respectively specifies, for each job where the execution is ended, durations from the execution start time of the job executed at the beginning in the job groups including the respective jobs to the execution start times of the respective jobs (for example, waiting times spent until the execution of the respective jobs is started).

The average time calculation unit 118 refers to the job status information 133 stored in the information storage area 130, and calculates an average time of the durations corresponding to the jobs satisfying the predetermined conditions among the jobs where the execution is ended. Specifically, for example, the average time calculation unit 118 calculates the average time of the durations corresponding to the multiple jobs having the high priority (for example, a predetermined number of jobs) among the jobs where the execution is ended.

The job number determination unit 119 updates (redetermines) the job number information 135 stored in the information storage area 130 so as to indicate a value lower than the current value.

Outline of First Embodiment

Figure 7:
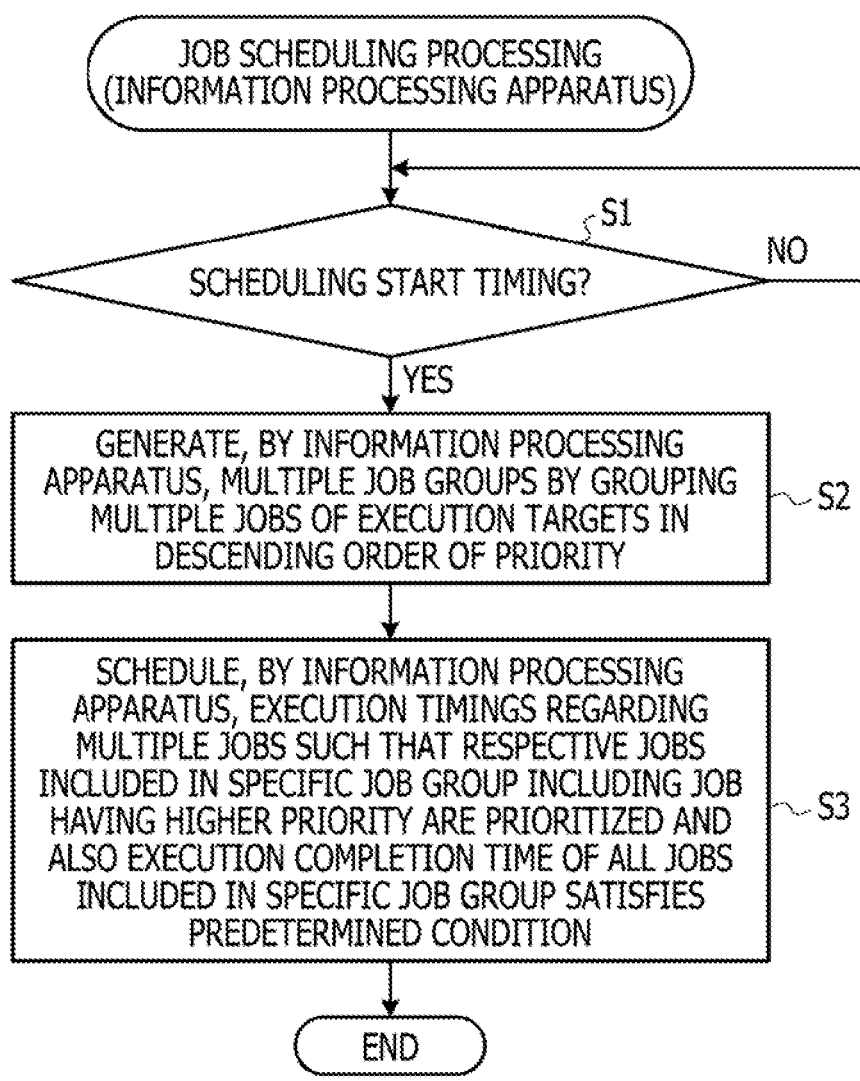
FIG. 7 is a flowchart for describing an outline of job scheduling processing according to a first embodiment.

Next, an outline of a first embodiment will be described. FIG. 7 is a flowchart for describing an outline of job scheduling processing according to the first embodiment.

As illustrated in FIG. 7, the information processing apparatus 1 waits for a scheduling start timing (NO in S1). For example, the scheduling start timing may be a timing when the job execution is started or a timing when the job execution is ended.

When the scheduling start timing has arrived (YES in S1), the information processing apparatus 1 generates multiple job groups by grouping multiple jobs of execution targets in descending order of the priority (S2).

Thereafter, the information processing apparatus 1 schedules execution timings regarding the multiple jobs such that the respective jobs included in the specific job group including the job having the higher priority are prioritized and also the execution completion time of all the jobs included in the specific job group satisfies a predetermined condition (S3).

Thus, the information processing apparatus 1 may schedule the execution timings of the respective jobs such that both avoiding of the delay in the execution timing of the job having the high priority and efficient execution of the respective jobs (improvement in a resource usage rate of the job execution apparatus 3 when the respective jobs are executed) are achieved.

Detail of First Embodiment

Next, a detail of the first embodiment will be described. FIGS. 8 to 13 are flowcharts for describing a detail of the job scheduling processing according to the first embodiment. FIGS. 14 to 28B are drawings for describing the detail of the job scheduling processing according to the first embodiment.

[Job Management Processing]

Figure 8:
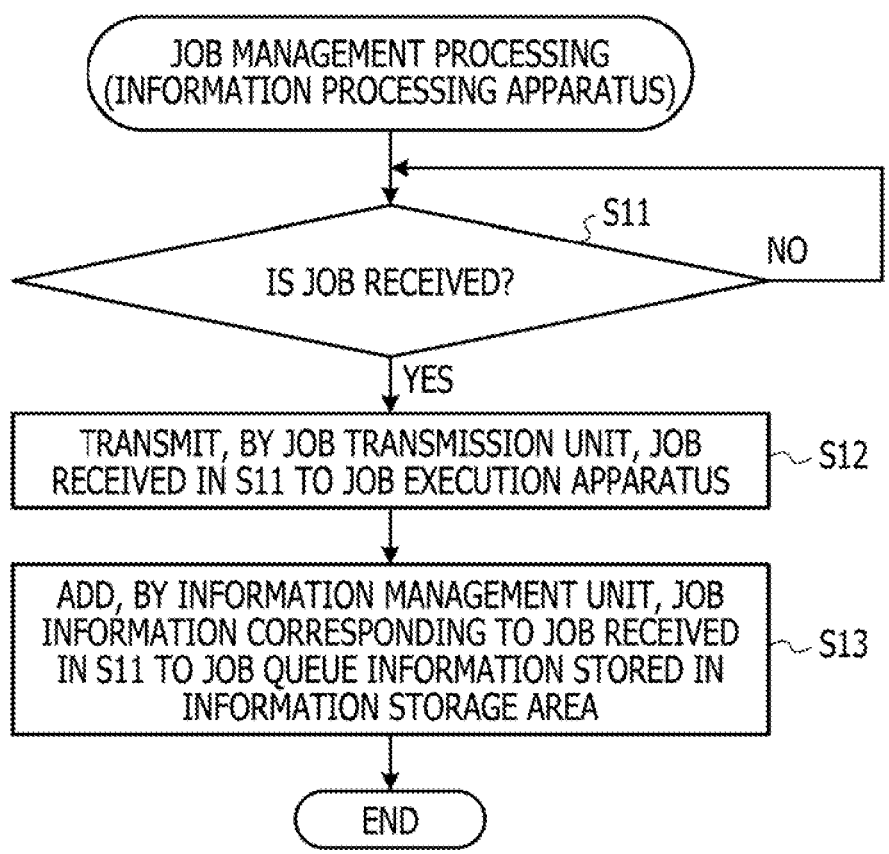
FIG. 8 is a flowchart for describing a detail of the job scheduling processing according to the first embodiment.
Figure 9:
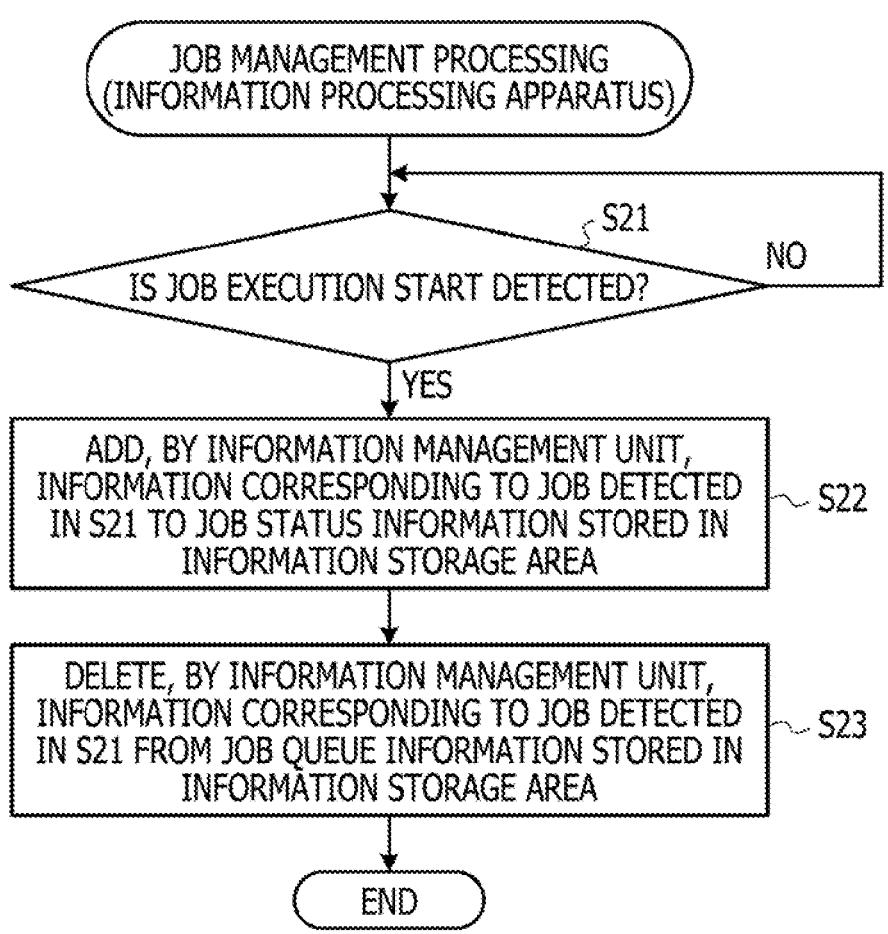
FIG. 9 is a flowchart for describing the detail of the job scheduling processing according to the first embodiment.
Figure 10:
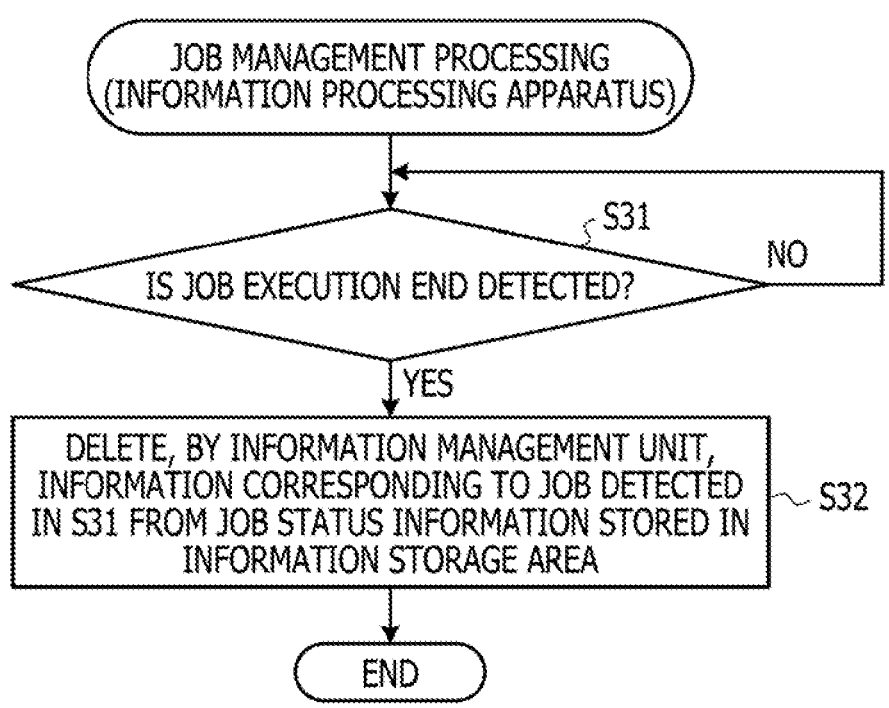
FIG. 10 is a flowchart for describing the detail of the job scheduling processing according to the first embodiment.

First, processing for managing the jobs (hereinafter, also referred to as job management processing) in the job scheduling processing will be described. FIGS. 8 to 10 are flowcharts for describing the job management processing.

As illustrated in FIG. 8, the information reception unit 111 of the information processing apparatus 1 waits until the job transmitted from the operation terminal 2 is received (NO in S11).

When the job is received (YES in S11), the job transmission unit 113 of the information processing apparatus 1 transmits the job received in the processing in S11 to the job execution apparatus 3 (S12).

In this case, the information management unit 112 of the information processing apparatus 1 adds the job information 131 corresponding to the job received in the processing in S11 to the job queue information 132 stored in the information storage area 130 (S13). Specifically, for example, the information management unit 112 adds the job information 131 received in the processing in S11 together with the job to the job queue information 132 stored in the information storage area 130. Hereinafter, a specific example of job queue information 132 will be described.

[Specific Example of Job Queue Information (1)]

FIG. 14 is a drawing for describing a specific example of the job queue information 132.

The job queue information 132 illustrated in FIG. 14 has, as items, an "item number" where pieces of information for identifying respective information included in the job queue information 132 are set, a "job name" where names of the respective jobs are set, a "node number" where the number of nodes used for executing the respective jobs in the job information 131 corresponding to the respective jobs, and an "execution time" where the execution times of the respective jobs are set in the job information 131 corresponding to the respective jobs. The job queue information 132 illustrated in FIG. 14 has an "accepted time" where times when the information reception unit 111 receives the respective jobs in the processing in S11 as an item.

Specifically, for example, in the job queue information 132 illustrated in FIG. 14, for the information where the "item number" is "1", "JOB-A2" is set as the "job name", "20 (nodes)" is set as the "node number", "20 (minutes)" is set as the "execution time", and "11:12" is set as the "accepted time".

In the job queue information 132 illustrated in FIG. 14, for the information where the "item number" is "2", "JOB-05" is set as the "job name", "60 (nodes)" is set as the "node number", "20 (minutes)" is set as the "execution time", and "11:15" is set as the "accepted time".

In the job queue information 132 illustrated in FIG. 14, for the information where the "item number" is "3", "JOB-D1" is set as the "job name", "40 (nodes)" is set as the "node number", "30 (minutes)" is set as the "execution time", "11:16" is set as the "accepted time". Descriptions of other information included in FIG. 14 are omitted.

With reference to FIG. 9 again, the information reception unit 111 waits until the start of the execution of the new job in the job execution apparatus 3 is detected (NO in S21). Specifically, for example, the information reception unit 111 waits until the information indicating the start of the execution of the new job is received from the job execution apparatus 3.

When the start of the execution of the new job in the job execution apparatus 3 is detected (YES in S21), the information management unit 112 adds information corresponding to the job where the start of the execution is detected in the processing in S21 to the job status information 133 stored in the information storage area 130 (S22).

In this case, the information management unit 112 of the information processing apparatus 1 deletes information corresponding to the job where the start of the execution is detected in the processing in S21 from the job queue information 132 stored in the information storage area 130 (S23).

As illustrated in FIG. 10, the information reception unit ill waits until the end of the execution of the job in the job execution apparatus 3 is detected (NO in S31). Specifically, for example, the information reception unit 111 waits until the information indicating the end of the execution of the job is received from the job execution apparatus 3.

When the end of the execution of the job in the job execution apparatus 3 is detected (YES in S31), the information management unit 112 deletes the information corresponding to the job where the end of the execution is detected in the processing in S31 from the job status information 133 stored in the information storage area 130 (S32). Hereinafter, a specific example of the job status information 133 will be described.

[Specific Example of Job Status Information (1)]

FIG. 15 is a drawing for describing the specific example of the job status information 133.

The job status information 133 illustrated in FIG. 15 has, as items, an "item number" where pieces of information for identifying respective information included in the job status information 133 are set, a "job name" where names of the respective jobs (jobs being executed in the job execution apparatus 3) are set, and an "execution node" where pieces of information indicating nodes used for the execution of the respective jobs are set. The job status information 133 illustrated in FIG. 15 has, as items, an "execution start time" where execution start times of the respective jobs are set, and an "execution end time" where expected execution end times of the respective jobs are set. Hereinafter, descriptions will be provided while pieces of identification information of 100 (nodes) included in the job execution apparatus 3 are respectively N1 to N100.

Specifically, for example, in the job status information 133 illustrated in FIG. 15, for the information where the "item number" is "1", "JOB-A4" is set as the "job name", "N1" to "N40" eN1-N401 are set as the "execution node", "11:40" is set as the "execution start time", and "12:00" is set as the "execution end time".

In the job status information 133 illustrated in FIG. 15, for the information where the "item number" is "2", "JOB-B2"

is set as the "job name", "N41" to "N80" ("N41-N80") are set as the "execution node", "11:50" is set as the "execution start time", and "12:00" is set as the "execution end time".

In the job status information 133 illustrated in FIG. 15, for the information where the "item number" is "3", "JOB-A7" is set as the "job name", "N81" to "N100" ("N81-N100") are set as the "execution node", "11:20" is set as the "execution start time", and "12:00" is set as the "execution end time".

For example, the job status information 133 illustrated in FIG. 15 indicates that three jobs are being executed in the job execution apparatus 3, and the execution of all the jobs is expected to end at 12:00.

[Main Processing of Job Scheduling Processing]

Figure 11:
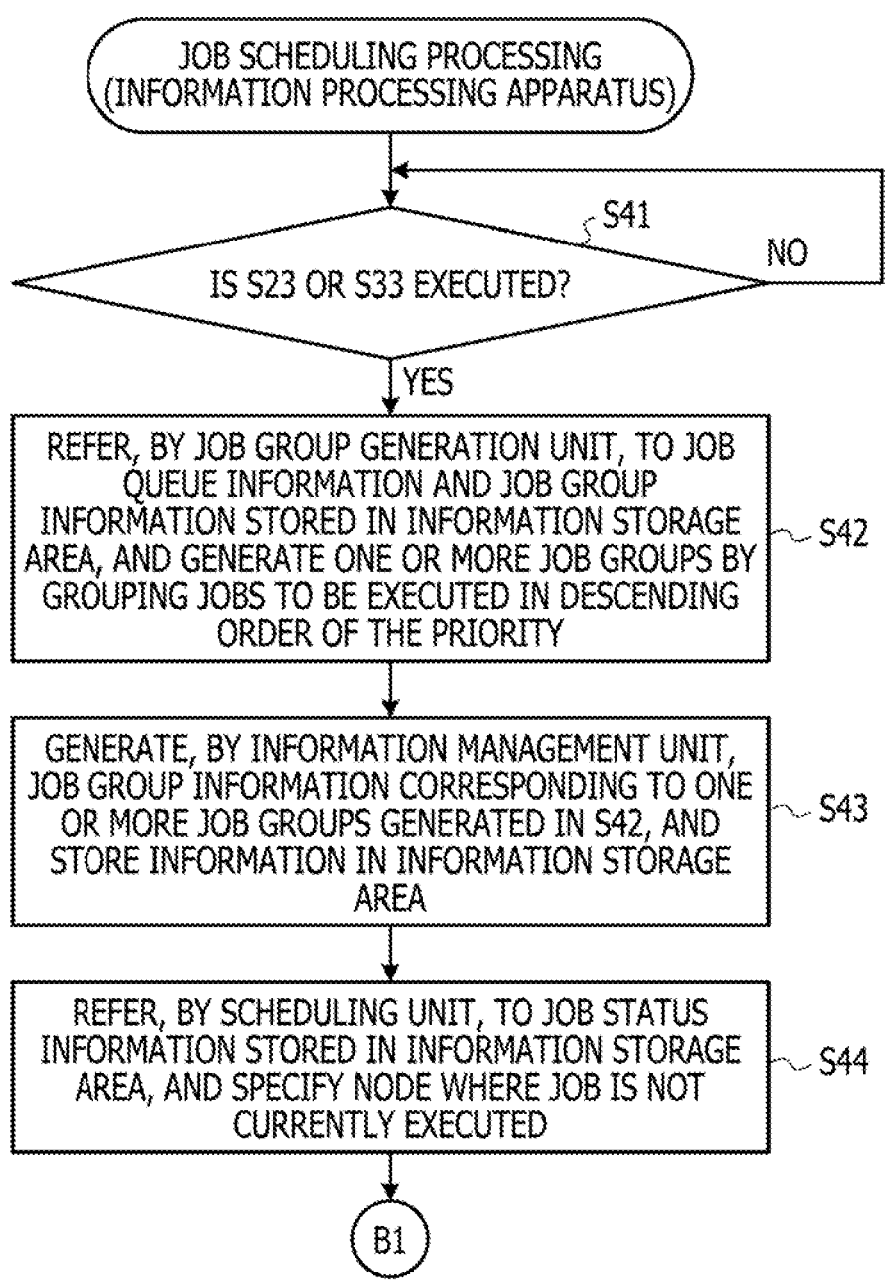
FIG. 11 is a flowchart for describing the detail of the job scheduling processing according to the first embodiment.
Figure 12:
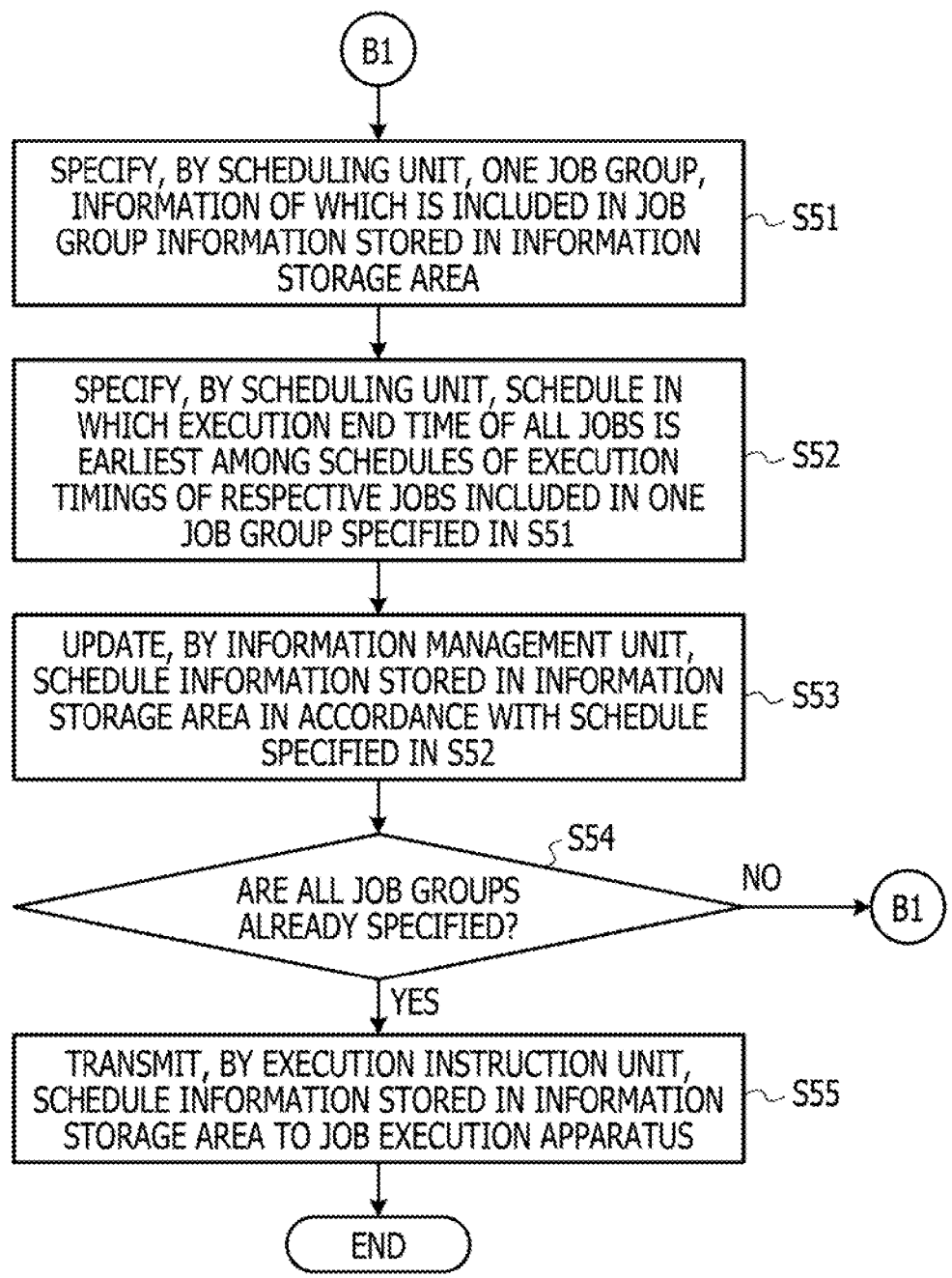
FIG. 12 is a flowchart for describing the detail of the job scheduling processing according to the first embodiment.

Next, main processing of the job scheduling processing will be described. FIGS. 11 and 12 are flowcharts for describing the main processing of the job scheduling processing.

As illustrated in FIG. 11, for example, the information reception unit 111 waits until the processing in S23 or S32 is executed (NO in S41). For example, the information reception unit 111 waits until the execution of the new job in the job execution apparatus 3 is started or the execution of the job in the job execution apparatus 3 is ended.

When the processing in S23 or S32 is executed (YES in S41), the job group generation unit 114 of the information processing apparatus 1 refers to the job queue information 132 and the job group information 134 stored in the information storage area 130, and generates one or more job groups by grouping the jobs to be executed in descending order of the priority (S42). Specifically, for example, the job group generation unit 114 generates job groups each having the same number of jobs as the number indicated by the job group information 134.

Thereafter, the information management unit 112 generates the job group information 134 corresponding to the one or more job groups generated in the processing in S42, and stores the job group information 134 in the information storage area 130 (S43) Hereinafter, a specific example of the job group information 134 will be described.

[Specific Example of Job Group Information (1)]

FIG. 16 is a drawing for describing the specific example of the job group information 134.

The job group information 134 illustrated in FIG. 16 has, as items, an "item number" where pieces of information for identifying respective information included in the job group information 134 are set, a "job name" where names of the respective jobs are set, and a "job group name" where names of the respective job groups are set.

Specifically, for example, in the job queue information 132 described in FIG. 14, the job names set in the "job name" are "JOB-A2", "JOB-C5", "JOB-D1", "JOB-A8", "JOB-A6", "JOB-D5", "JOB-C3", "JOB-B3", "JOB-D9", and "JOB-C2" in ascending order of the time set in the "accepted time".

For this reason, for example, when the value indicated by the job number information 135 is "3", the information management unit 112 sets "G1" in each "job group name" of information where "JOB-A2", "JOB-C5", or "JOB-D1" is set in the "job name" (information where the "item number" is "1", "2", or "3").

Similarly, the information management unit 112 sets "G2" in each "job group name" of information where "JOB-A8", "JOB-A6", or "JOB-D5" is set as the "job name" (information where the "item number" is "4", "5", or "6"), sets "G3" in each "job group name" of information where "JOB-C3", "JOB-B3", or "JOB-D9" is set as the "job name" (information where the "item number" is "7", "8", or "9"), and sets "G4" in the "job group name" of information where "JOB-C2" is set as the "job name" (information where the "item number" is "10").

Hereinafter, a job group where the "job group name" is "G1" is also referred to as a job group G1, a job group where the "job group name" is "G2" is also referred to as a job group G2, a job group where the "job group name" is "G3" is also referred to as a job group G3, and a job group where the "job group name" is "G4" is also referred to as a job group G4.

With reference to FIG. 11 again, the scheduling unit 115 of the information processing apparatus 1 refers to the job status information 133 stored in the information storage area 130, and specifies the node where the job is not currently executed (S44).

As illustrated in FIG. 12, the scheduling unit 115 specifies one job group, information of which is included in the job group information 134 stored in the information storage area 130 (S51).

Subsequently, the scheduling unit 115 specifies a schedule in which the execution end time of all the jobs is the earliest among the schedules of the execution timings of the respective jobs included in the one job group specified in the processing in S51 (S52). Hereinafter, a specific example of the scheduling specified in the processing in S52 will be described

[Specific Example of Schedule (1)]

FIGS. 17A to 17F and 18 are drawings for describing the specific example of the schedule of the job execution timings. FIGS. 17A to 17F and 18 are drawings for describing a case where the job group specified in the first processing in S51 is the job group G1.

Specifically, for example, in the job queue information 132 described in FIG. 14, "20 (nodes)" and "20 (minutes)" are respectively set as the "node number" and the "execution time" of the information where the "job name" is "JOB-A2" (information where the "item number" is "1"). "60 (nodes)" and "20 (minutes)" are respectively set as the "node number" and the "execution time" of the information where the "job name" is "JOB-C5" (information where the "item number" is "2"), and "40 (nodes)" and "30 (minutes)" are respectively set as the "node number" and the "execution time" of the information where the "job name" is "JOB-D1" (information where the "item number" is "3").

Figure 17A:
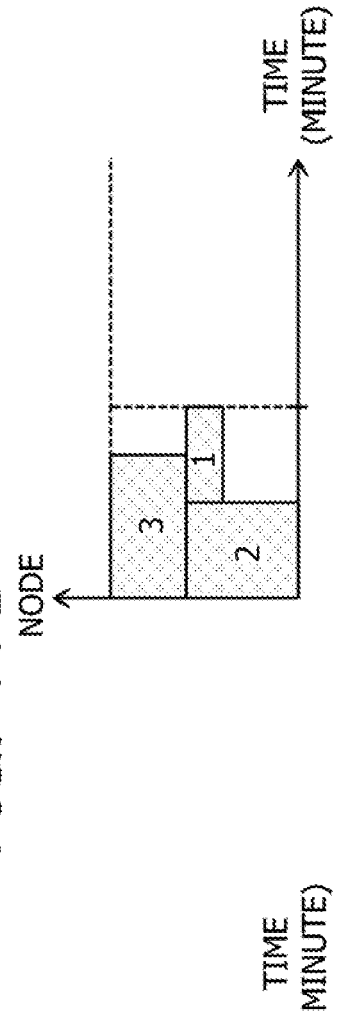
FIG. 17A is a drawing for describing a specific example of a schedule of job execution timings.
Figure 17B:
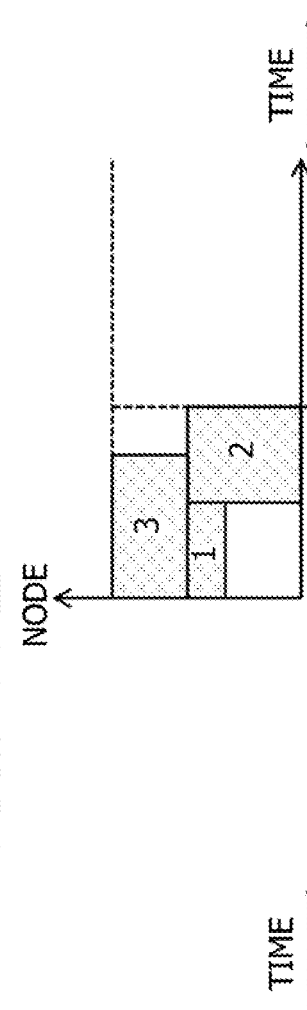
FIG. 17B is a drawing for describing a specific example of a schedule of job execution timings.
Figure 17C:
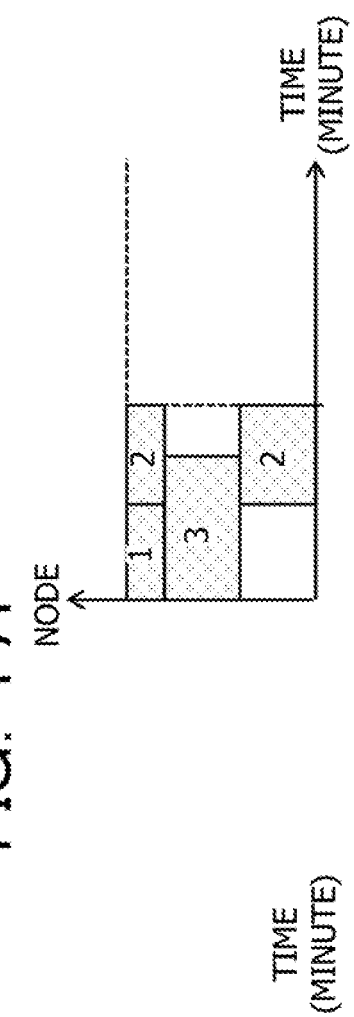
FIG. 17C is a drawing for describing a specific example of a schedule of job execution timings.
Figure 17D:
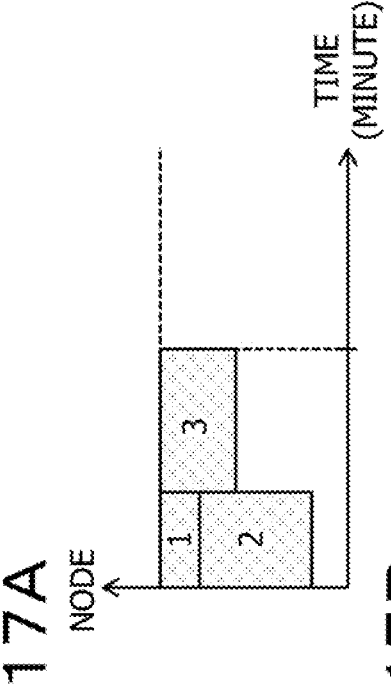
FIG. 17D is a drawing for describing a specific example of a schedule of job execution timings.
Figure 17E:
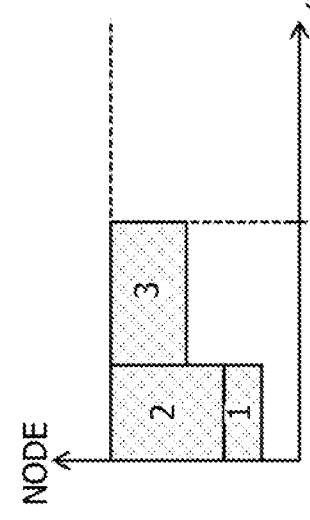
FIG. 17E is a drawing for describing a specific example of a schedule of job execution timings.
Figure 17F:
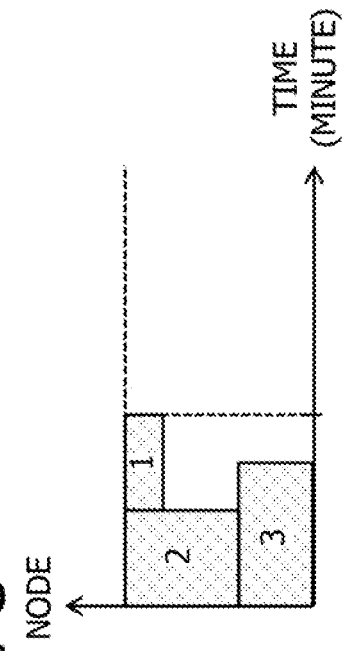
FIG. 17F is a drawing or describing a specific example of a schedule of job execution timings.

For example, when the job 1 and the job 2 are executed at the beginning, as illustrated in FIGS. 17A and 17B, the time spent for ending the execution of all of the job 1, the job 2, and the job 3 is 50 (minutes). For example, when the job 2 and the job 3 are executed at the beginning, as illustrated in FIGS. 17C and 17D, the time spent for ending the execution of all of the job 1, the job 2, and the job 3 is 40 (minutes). Similarly, for example, when the job 1 and the job 3 are executed at the beginning, as illustrated in FIGS. 17E and 17F, the time spent for ending the execution of all of the job 1, the job 2, and the job 3 is 40 (minutes).

Figure 18:
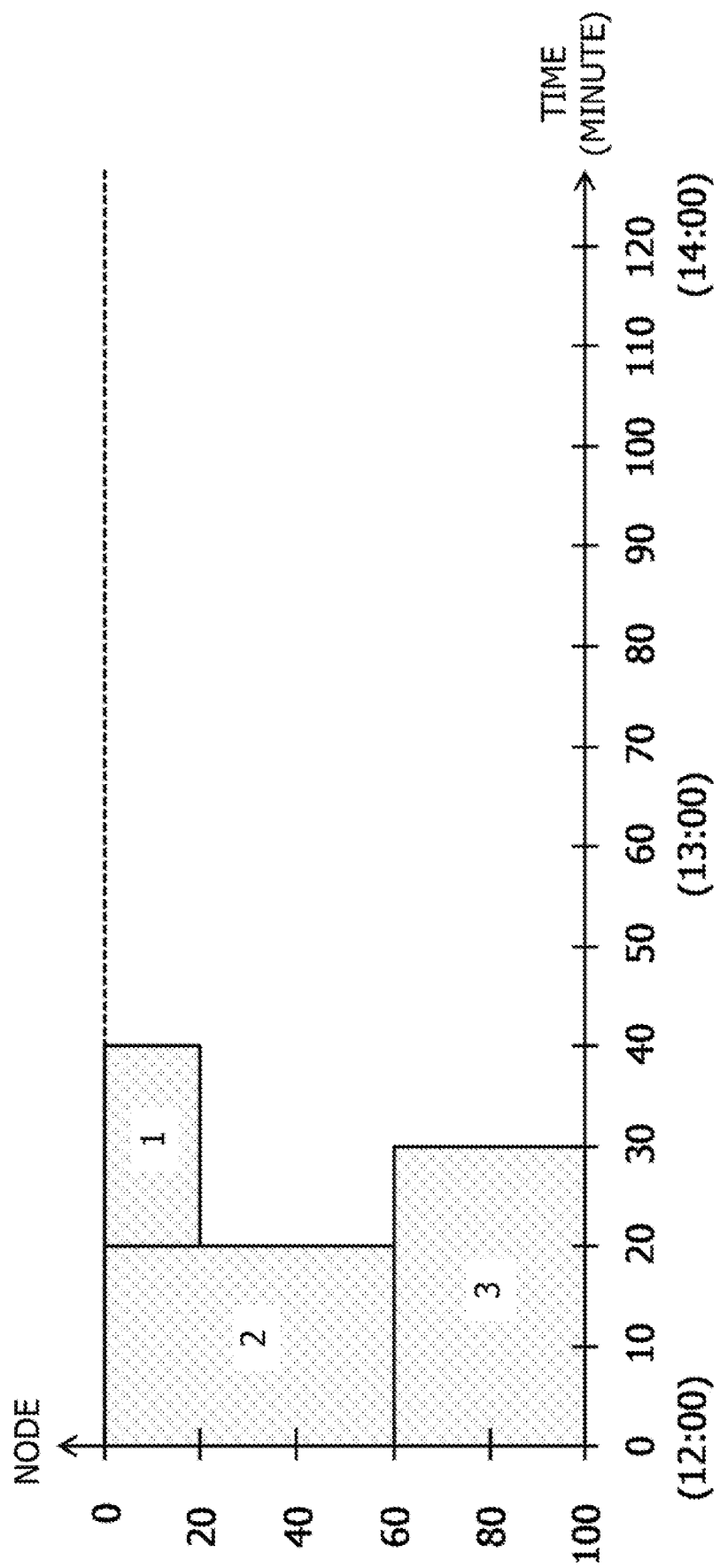
FIG. 18 is a drawing for describing the specific example of the schedule of the job execution timings.

For this reason, as illustrated in FIG. 18, for example, the scheduling unit 115 selects the schedule in which the job 2 and the job 3 are executed at the beginning (one of the schedules in which the time spent for ending the execution of all of the jobs is the shortest).

With reference to FIG. 12 again, the information management unit 112 updates the schedule information 136 stored in the information storage area 130 in accordance with the schedule specified in the processing in S52 (S53) Hereinafter, a specific example of the schedule information 136 will be described.

[Specific Example of Schedule Information (1)]

FIG. 19 is a drawing for describing a specific example of the schedule information 136. FIG. 19 is a drawings for describing the specific example of the schedule information 136 generated when the job group specified in the first processing in S51 is the job group G1.

The schedule information 136 illustrated in FIG. 19 has, as items, an "item number" where pieces of information for identifying respective information included in the schedule information 136 are set, a "job name" where names of the respective jobs are set, and an "execution node" where pieces of information indicating nodes used for the execution of the respective jobs are set. The schedule information 136 illustrated in FIG. 19 has, as items, an "execution start time" where execution start times of the respective jobs are set, and an "execution end time" where expected execution end times of the respective jobs are set.

Specifically, for example, the schedule described in FIG. 18 indicates that the execution nodes of the job 1 are N1 to N20, and the execution time of the job 1 is 12:20 to 12:40. The schedule described in FIG. 18 indicates that the execution nodes of the job 2 are N1 to N60, and the execution time of the job 2 is 12:00 to 12:20. The schedule described in FIG. 18 indicates that the execution nodes of the job 3 are N61 to N100, and the execution time of the job 3 is 12:00 to 12:30.

For this reason, as illustrated in FIG. 19, for example, the information management unit 112 sets "N1" to "N20" ("N1-N20") as the "execution nodes" of the information where the "job name" is "JOB-A2" (information where the "item number" is "1"), sets "12:20" as the "execution start time", and sets "12:40" as the "execution end time". The information management unit 112 sets "N1" to "N60" ("N1-N60") as the "execution nodes" of the information where the "job name" is "JOB-C5" (information where the "item number" is "2"), sets "12:00" as the "execution start time", and sets "12:20" as the "execution end time". The information management unit 112 sets "N61" to "N100" ("N61-N100") as the "execution nodes" of the information where the "job name" is "JOB-D1" (information where the "item number" is "3"), sets "12:00" as the "execution start time", and sets "12:30" as the "execution end time".

With reference to FIG. 12 again, when all the job groups are specified in the processing in S51 (YES in S54), the execution instruction unit 116 of the information processing apparatus 1 transmits the schedule information 136 stored in the information storage area 130 to the job execution apparatus 3 (S55).

For example, in this case, the execution instruction unit 116 determines that the generation of the schedule information 136 is completed, and transmits the information to the job execution apparatus 3.

When all the job groups are not specified in the processing in S51 (NO in S54), the execution instruction unit 116 performs the processing in S51 and subsequent steps again.

[Specific Example of Schedule (2)]

Figure 20:
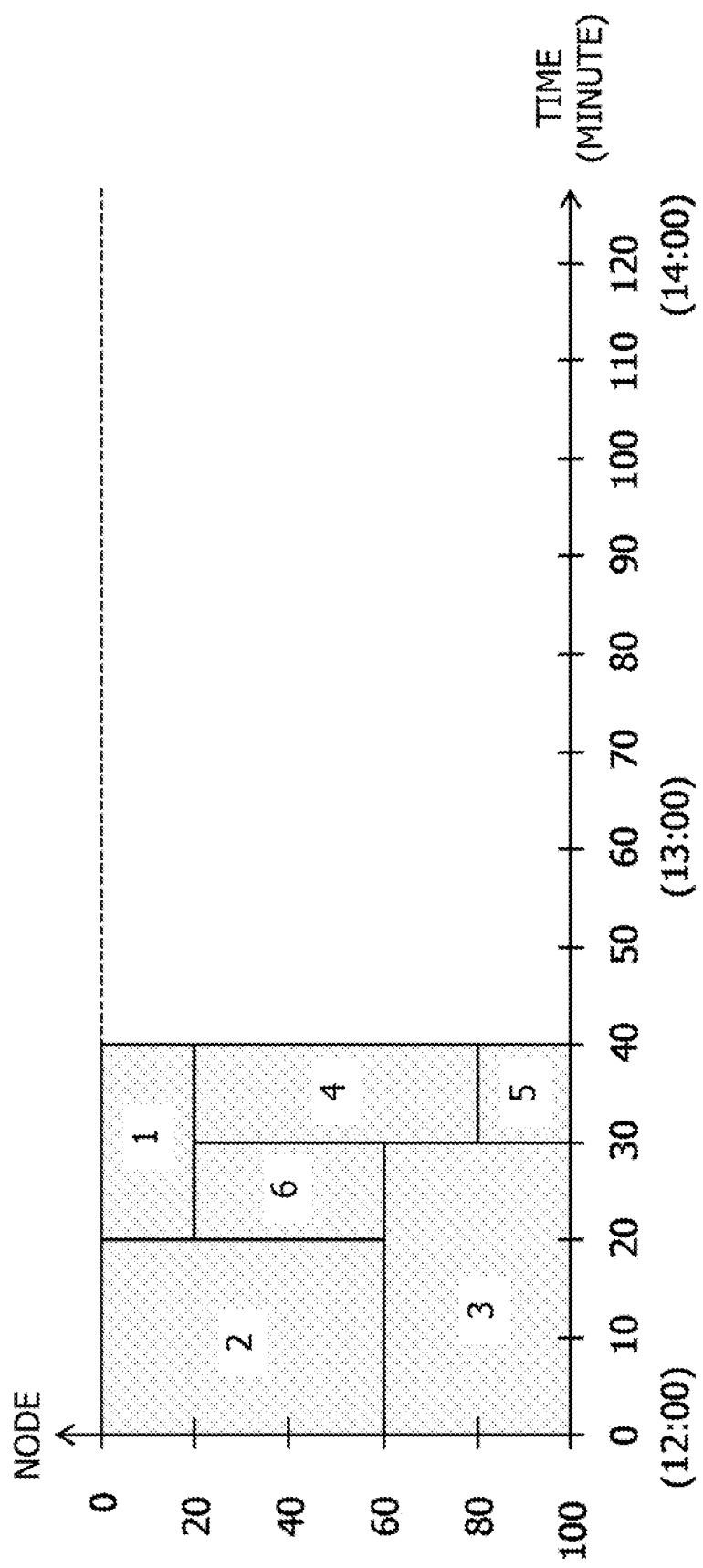
FIG. 20 is a drawing for describing the specific example of the schedule of the job execution timings.

Next, the specific example of the schedule selected when the job group specified in the second processing in S51 is the job group G2 will be described. FIG. 20 is a drawing for describing the specific example of the schedule of the job execution timings.

Specifically, for example, in the job queue information 132 described in FIG. 14, "60 (nodes)" and "10 (minutes)" are respectively set as the "node number" and the "execution time" of the information where the "job name" is "JOB-A8" (information where the "item number" is "4"). "20 (nodes)" and "10 (minutes)" are respectively set as the "node number" and the "execution time" of the information where the "job name" is "JOB-A6" (information where the "item number" is "5"), and "40 (nodes)" and "10 (minutes)" are respectively set as the "node number" and the "execution time" of the information where the "job name" is "30B-D5" (information where the "item number" is "6").

In the example illustrated in FIG. 18, the job 1 is expected to be executed in a time slot from the timing when the "time (minutes)" is "20 (minutes)" to the timing when the "time (minutes)" is "40 (minutes)". In the example illustrated in FIG. 18, the job 3 is expected to be executed in a time slot from the timing when the "time (minutes)" is "0 (minutes)" to the timing when the "time (minutes)" is "30 (minutes)".

For this reason, as illustrated in FIG. 20, for example, the scheduling unit 115 selects the schedule (one of the schedules in which the time spent for ending the execution of all the jobs is the shortest) in which the job 6 is executed between the timing when the "time (minutes)" is "20 (minutes)" and the timing when the "time (minutes)" is "30 (minutes) (in the time slot when the job 1 and the job 3 are executed), and the job 4 and the job 5 are executed between the timing when the "time (minutes)" is "30 (minutes)" and the timing when the "time (minutes)" is "40 (minutes) (in the time slot when the job 1 is executed.

[Specific Example of Schedule Information (2)]

Next, the specific example of the schedule information 136 generated when the job group specified in the second processing in S51 is the job group G2 will be described. FIG. 21 is a drawing for describing the specific example of the schedule information 136.

The schedule described in FIG. 20 indicates that the execution nodes of the job 4 are N21 to N80, and the execution time of the job 4 is 12:30 to 12:40. The schedule described in FIG. 20 indicates that the execution nodes of the job 5 are N81 to N100, and the execution time of the job 5 is 12:30 to 12:40. The schedule described in FIG. 20 indicates that the execution nodes of the job 6 are N21 to N60, and the execution time of the job 6 is 12:20 to 12:30.

For this reason, as indicated by an underlined part in FIG. 21, the information management unit 112 sets "N21" to "N80" ("N21-N80") as the "execution nodes" of the information where the "job name" is "JOB-A8" (information where the "item number" is "4"), sets "12:30" as the "execution start time", and sets "12:40" as the "execution end time". The information management unit 112 sets "N81" to "N100" ("N81-N100") as the "execution nodes" of the information where the "job name" is "JOB-A6" (information where the "item number" is "5"), sets "12:30" as the "execution start time", and sets "12:40" as the "execution end time". The information management unit 112 sets "N21" to "N60" ("N21-N60") as the "execution nodes" of the information where the "job name" is "JOB-D5" (information where the "item number" is "6"), sets "12:20" as the "execution start time", and sets "12:30" as the "execution end time".

[Specific Example of Schedule (3)]

Figure 22:
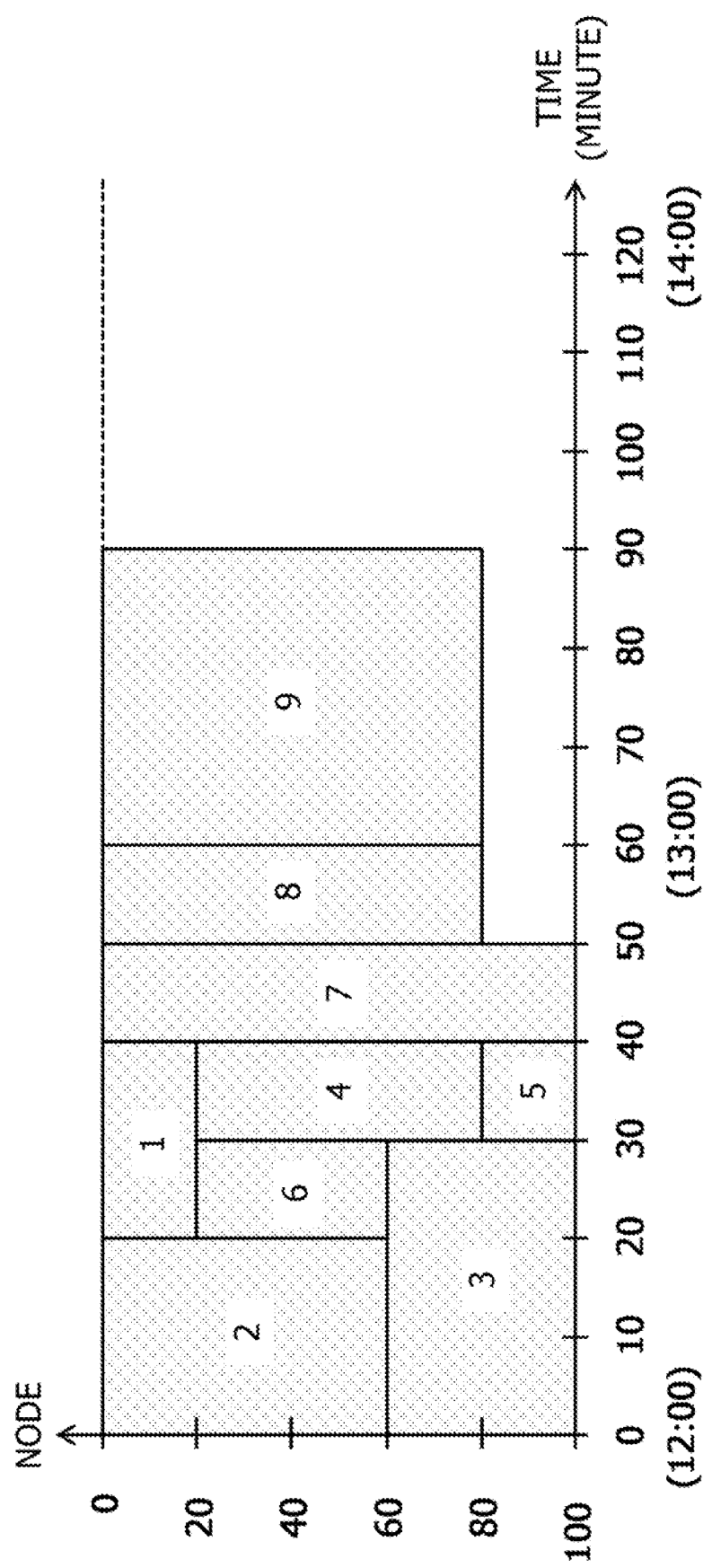
FIG. 22 is a drawing for describing the specific example of the schedule of the job execution timings.

Next, the specific example of the schedule selected when the job group specified in the third processing in S51 is the job group G3 will be described, FIG. 22 is a drawing for describing the specific example of the schedule of the job execution timings.

Specifically, for example, in the job queue information 132 described in FIG. 14, "100 (nodes)" and "10 (minutes)" are respectively set as the "node number" and the "execution time" of the information where the "job name" is "JOB-C3" (information where the "item number" is "7"). "80 (nodes)" and "10 (minutes)" are respectively set as the "node number" and the "execution time" of the information where the "job name" is "JOB-B3" (information where the "item number" is "8"), and "80 (nodes)" and "30 (minutes)" are respectively set as the "node number" and the "execution time" of the information where the "job name" is "JOB-D9" (information where the "item number" is "9").

In the example illustrated in FIG. 20, at the timing when the "time (minutes)" is "40 (minutes)", the execution of all the jobs from the job 1 to the job 6 is expected to be ended.

For this reason, as illustrated in FIG. 22, for example, the scheduling unit 115 selects the schedule (one of the schedules in which the time spent for ending the execution of all the jobs is the shortest) in which the job 7 is executed between the timing when the "time (minutes)" is "40 (minutes)" and the timing when the "time (minutes)" is "50 (minutes), the job 8 is executed between the timing when the "time (minutes)" is "50 (minutes)" and the timing when the "time (minutes)" is "60 (minutes), and the job 9 is executed between the timing when the "time (minutes)" is "60 (minutes)" and the timing when the "time (minutes)" is "90 (minutes).

[Specific Example of Schedule Information (3)]

Next, the specific example of the schedule information generated when the job group specified in the third processing in S51 is the job group G3 will be described. FIG. 23 is a drawing for describing the specific example of the schedule information 136.

The schedule described in FIG. 22 indicates that the execution nodes of the job 7 are N1 to N100, and the execution time of the job 7 is 12:40 to 12:50. The schedule described in FIG. 22 indicates that the execution nodes of the job 8 are N1 to N80, and the execution time of the job 8 is 12:50 to 13:00. The schedule described in FIG. 22 indicates that the execution nodes of the job 9 are N1 to N80, and the execution time of the job 9 is 13:00 to 13:30.

For this reason, as indicated by an underlined part in FIG. 23, the information management unit 112 sets "N1" to "N100" ("N1-N100") as the "execution nodes" of the information where the "job name" is "JOB-C3" (information where the "item number" is "7"), sets "12:40" as the "execution start time", and sets "12:50" as the "execution end time". The information management unit 112 sets "N1" to "N80" ("N1-N80") as the "execution nodes" of the information where the "job name" is "JOB-B3" (information where the "item number" is "8"), sets "12:50" as the "execution start time", and sets "13:00" as the "execution end time". The information management unit 112 sets "N1" to "N80" ("N1-N80") as the "execution nodes" of the information where the "job name" is "JOB-D9" (information where the "item number" is "9"), sets "13:00" as the "execution start time", and sets "13:30" as the "execution end time".

[Specific Example of Schedule (4)]

Figure 24:
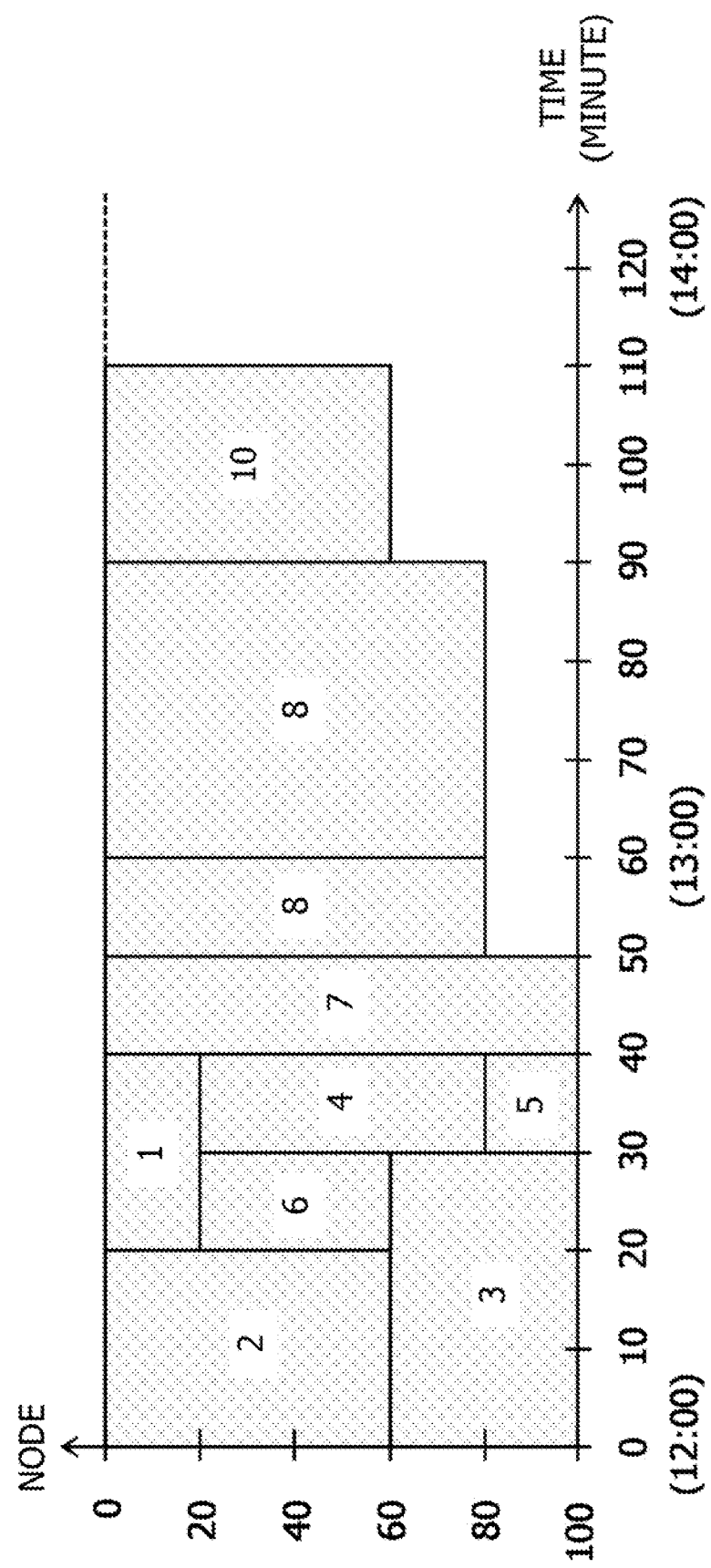
FIG. 24 is a drawing for describing the specific example of the schedule of the job execution timings.

Next, the specific example of the schedule selected when the job group specified in the fourth processing in S51 is the job group G4 will be described. FIG. 24 is a drawing for describing the specific example of the schedule of the job execution timings.

Specifically, for example, in the job queue information 132 described in FIG. 14, "60 (nodes)" and "20 (minutes)" are respectively set as the "node number" and the "execution time" of the information where the "job name" is "JOB-C2" (information where the "item number" is "10").

In the example illustrated in FIG. 22, at the timing when the "time (minutes)" is "90 (minutes)", the execution of all the jobs from the job 1 to the job 9 is expected to be ended.

For this reason, as illustrated in FIG. 24, for example, the scheduling unit 115 selects the schedule in which the job 10 is executed between the timing when the "time (minutes)" is "90 (minutes)" and the timing when the "time (minutes)" is "110 (minutes)".

[Specific Example of Schedule Information (4)]

Next, the specific example of the schedule information generated when the job group specified in the fourth processing in S51 is the job group G4 will be described, FIG. 25 is a drawing for describing the specific example of the schedule information 136.

The schedule described in FIG. 24 indicates that the execution nodes of the job 10 are N1 to N60, and the execution time of the job 10 is 13:30 to 13:50. For this reason, as indicated by an underlined part in FIG. 25, the information management unit 112 sets "N1" to "N60" ("N1-N60") as the "execution nodes" of the information where the "job name" is "JOB-C2" (information where the "item number" is "10"), sets "13:30" as the "execution start time", and sets "13:50" as the "execution end time".

In the processing in S55, the execution instruction unit 116 transmits the schedule information 136 illustrated in FIG. 25 to the job execution apparatus 3.

Thus, the information processing apparatus 1 may cause the job execution apparatus 3 to execute the respective jobs such that both avoiding of the delay in the execution timing of the job having the high priority (for example, the job having the early input order) and efficient execution of the respective jobs are achieved.

[Specific Example of Job Queue Information (2)]

Next, a specific example of the job queue information 132 will be described when the job execution apparatus 3 starts the job execution in accordance with the schedule information 136 described with reference to FIG. 25 (schedule information 136 transmitted by the execution instruction unit 116). FIG. 26 is a drawing for describing the specific example of the job queue information 132. Specifically, for example, FIG. 26 is a drawing for describing the specific example of the job queue information 132 when the execution of the job 2 and the job 3 is started among the jobs, information of which is included in the schedule information 136 illustrated in FIG. 25.

In this case, as illustrated in FIG. 26, the information management unit 112 deletes the information corresponding to the job 2 and the job 3 from the information included in the job queue information 132 described with reference to FIG. 14 (information where the "item number" is "2" and "3") (S23).

For example, when the job where the "job name" is "JOB-E1" and the job where the "job name" is "JOB-E2" are input while the job scheduling processing for creating the schedule information 136 described with reference to FIG. 25 is executed, as indicated by an underlined part in FIG. 26, the information management unit 112 adds the information where "JOB-E1" is set as "job name" (information where the "item number" is "11") and the information where "JOB-E2" is set as "job name" (information where the "item number" is "12") (S13).

[Specific Example of Job Status Information (2)]

Next, a specific example of the job status information 133 will be described when the job execution apparatus 3 starts the job execution in accordance with the schedule information 136 described with reference to FIG. 25 (schedule information 136 transmitted by the execution instruction unit 116). FIG. 27 is a drawing for describing the specific example of the job status information 133. Specifically, for example, FIG. 27 is a drawing for describing the specific example of the job status information 133 when the execution of the job 2 and the job 3 is started among the jobs, information of which is included in the schedule information 136 illustrated in FIG. 25.

In this case, as illustrated in FIG. 27, the information management unit 112 generates the job status information 133 including the information corresponding to the job 2 (information where the "item number" is "1") and the information corresponding to the job 3 (information where the "item number" is "2") (S22).

In the processing in S52, the information processing apparatus 1 may also be configured to specify combinations of jobs that may be executed at the same time in the job execution apparatus 3 among the respective jobs included in the job group specified in the processing in S51, and further specify a combination in which the number of nodes used for executing the jobs included in the respective combinations is the highest (hereinafter, also referred to as a specific combination) among the specified combinations of the jobs. The information processing apparatus 1 may also be configured to specify the schedule in which the respective jobs included in the specified specific combination are executed at the same time as a schedule corresponding to the job group specified in the processing in S51.

For example, when the execution end time of all the jobs in the schedule specified in the processing in S52 is the same as the execution end time of all the jobs in the schedule specified in the previous processing in S52, the information processing apparatus 1 may also be configured to interrupt the main processing of the job scheduling processing, and schedule the remaining jobs using, for example, a related-art method.

Thus, the information processing apparatus 1 may reduce the processing load caused by executing the processing in S52.

[Job Number Update Processing]

Figure 13:
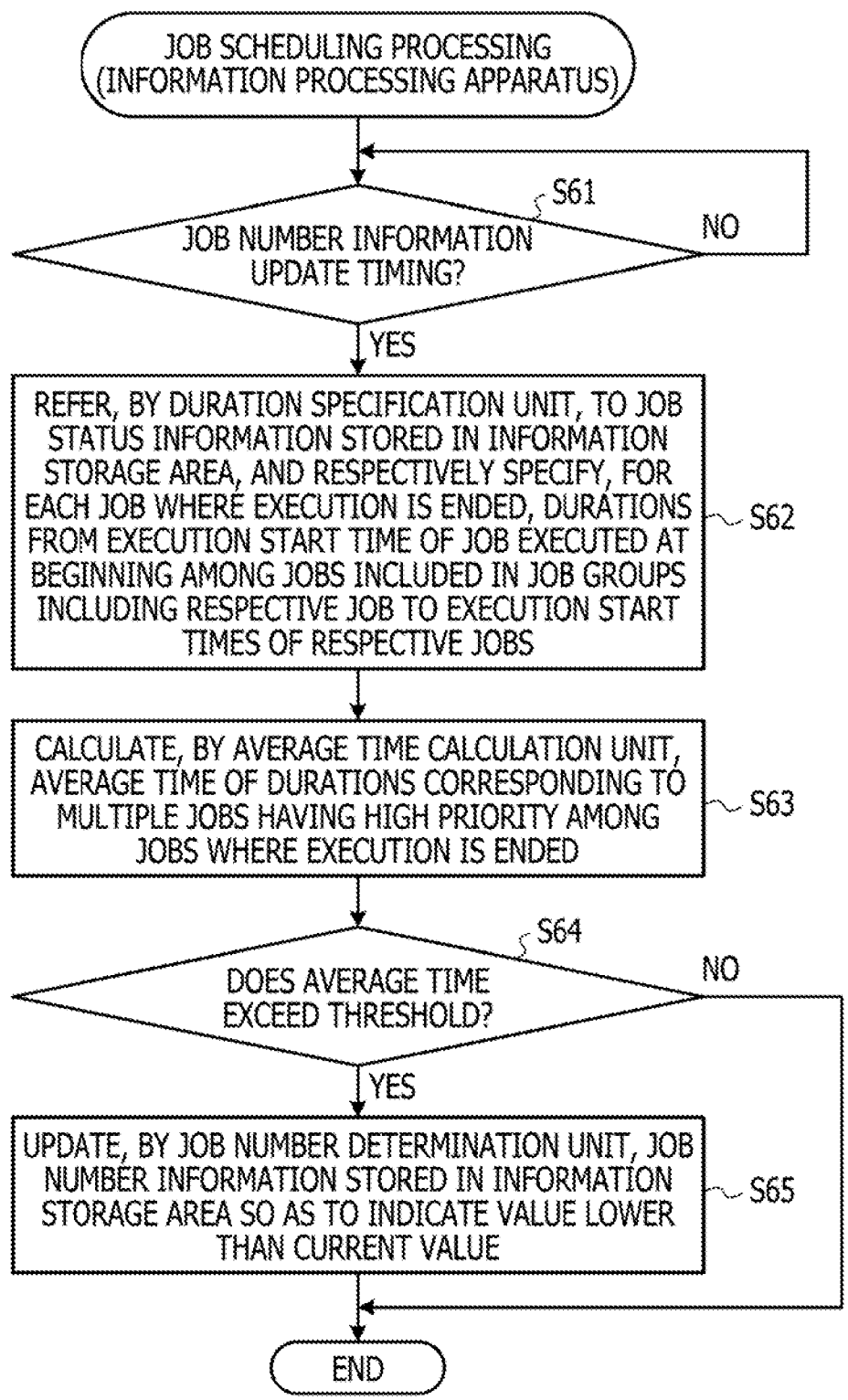
FIG. 13 is a flowchart for describing the detail of the job scheduling processing according to the first embodiment.

Next, processing for updating the job number information 135 (hereinafter, also referred to as job number update processing) in the job scheduling processing will be described. FIG. 13 is a flowchart for describing the job number update processing.

As illustrated in FIG. 13, the duration specification unit 117 of the information processing apparatus 1 waits for a job number information update timing (NO in S61). For example, the job number information update timing may be a timing when the execution of all the jobs, information of which is included the schedule information 136 transmitted by the job execution apparatus 3 in the processing in S55 is ended.

When the job number information update timing arrives (YES in S61), the duration specification unit 117 refers to the job status information 133 stored in the information storage area 130, and respectively specifies, for each job where the execution is ended after the job number update processing is performed last time, durations from the execution start time of the job executed at the beginning in the job groups including the respective jobs to the execution start times of the respective jobs (S62).

Sequentially, the average time calculation unit 118 of the information processing apparatus 1 calculates the average time of the durations corresponding to the multiple jobs having the high priority among the jobs where the execution is ended after the job number update processing is performed last time (S63).

Specifically, for example, the average time calculation unit 118 may also be configured to calculate the average time of the durations corresponding to a predetermined number of jobs having the high priority. For example, the average time calculation unit 118 may also be configured to calculate the average time of the durations corresponding to the jobs at a predetermined percentage from the top in terms of the priority.

Thereafter, the job number determination unit 119 of the information processing apparatus 1 determines whether or not the average time calculated in the processing in S63 exceeds a specific threshold (S64).

As a result, when it is determined that the average time calculated in the processing in S63 exceeds the specific threshold (YES in S64), the job number determination unit 119 performs the update such that the job number information 135 stored in the information storage area 130 indicates a lower value than the current value (S65).

When it is determined that the average time calculated in the processing in S63 does not exceed the specific threshold (NO in S64), the job number determination unit 119 does not perform the processing in S65.

For example, when it is determined that a ratio of jobs where the execution timing is out of a permissible range in the multiple jobs having the high priority, the information processing apparatus 1 performs an adjustment such that the numbers of jobs included in the respective job groups are decreased.

Thus, the information processing apparatus 1 may stably avoid the delay of the execution timing of the job having the high priority.

When it is determined that the average time calculated in the processing in S63 is below another threshold different from the specific threshold, the job number determination unit 119 may also be configured to perform the update such that the job number information 135 stored in the information storage area 130 indicates a value higher than the current value (S65).

As described above, the information processing apparatus 1 according to the present embodiment generates the one or more job groups by grouping the multiple jobs of execution targets in descending order of the priority. The information processing apparatus 1 schedules the execution timings regarding the multiple jobs such that the scheduling of the respective jobs included in the specific job group including the job having the higher priority is implemented by priority over the scheduling of the respective jobs included in the other job groups. In this case, the information processing apparatus 1 schedules the execution timings regarding the respective jobs included in the specific job group such that an execution completion time of all the jobs included in the specific job group satisfies a predetermined condition.

For example, the information processing apparatus 1 performs the scheduling without taking into account the priority in a relationship between the jobs included in the same job group while the respective jobs included in the job group including the job having the high priority are prioritized ever the respective jobs included in the other job groups.

Thus, the information processing apparatus 1 may schedule the execution timings of the respective jobs such that both avoiding of the delay in the execution timing of the job having the high priority and efficient execution of the respective jobs are achieved.

Figure 28A:
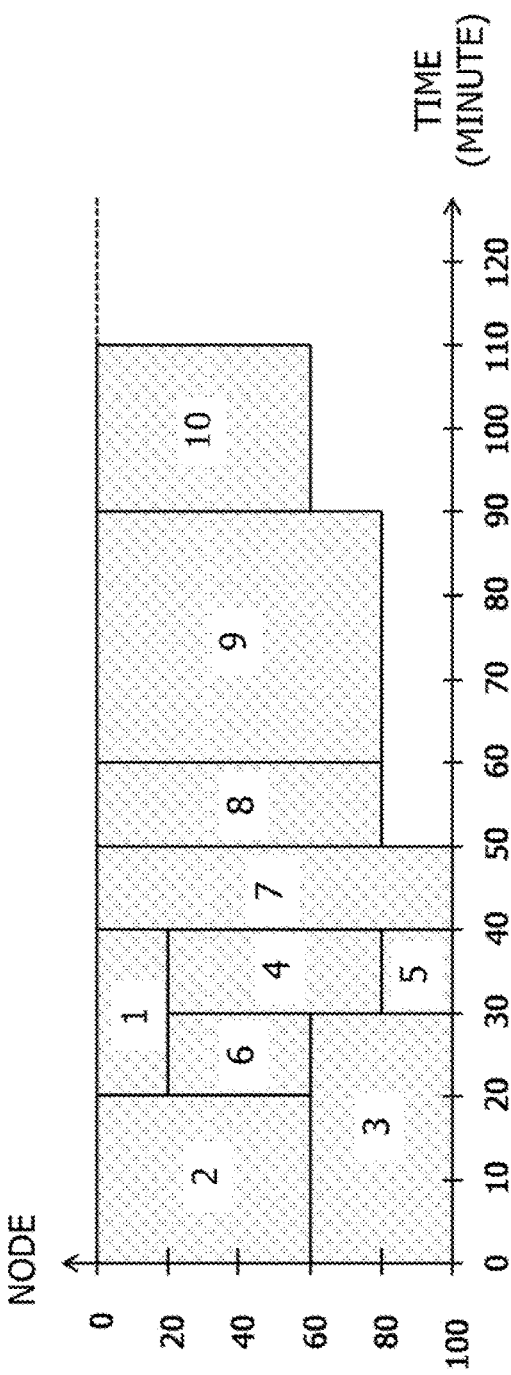
FIG. 28A is a drawing for describing effects of the job scheduling processing according to the first embodiment.
Figure 28B:
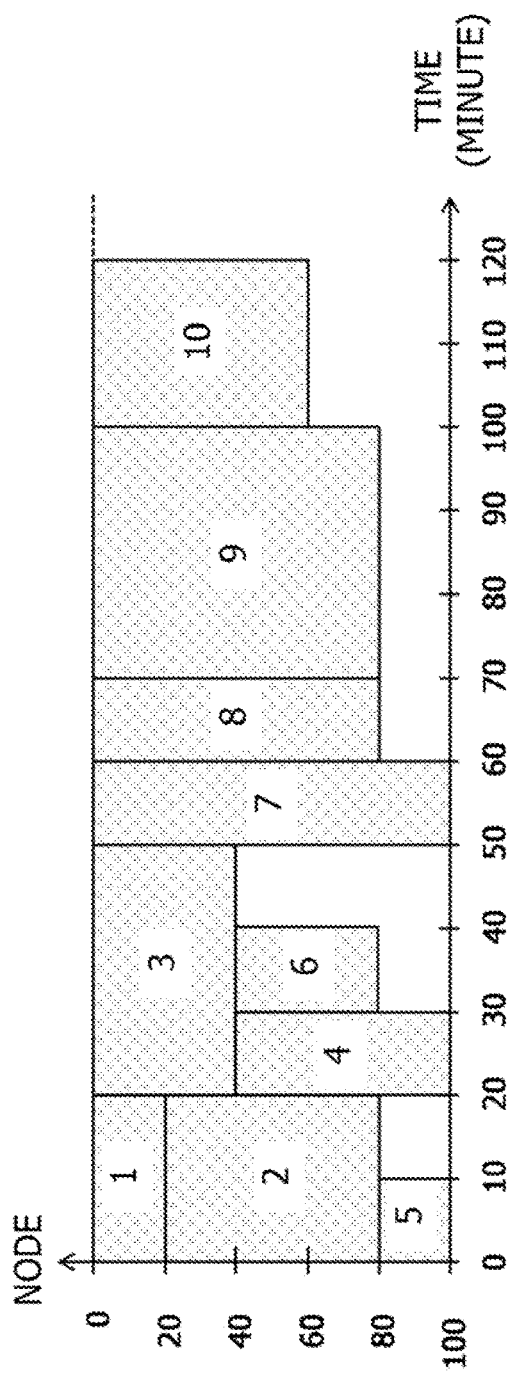
FIG. 28B is a drawing for describing effects of the job scheduling processing according to the first embodiment.

Specifically, for example, as Illustrated in FIG. 28A, the information processing apparatus 1 according to the present embodiment may bring forward the execution completion times of the respective jobs as compared with a case where the related-art method is used (illustrated in FIG. 28B), and also a long delay of the execution timing of the job having the high priority (for example, the job 1) may be avoided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor couple to the memory and configured to:
   generate a plurality of job groups by grouping, in descending order of priority, multiple jobs of execution targets, each of the multiple jobs being associated with an individual priority from higher to lower based on a first-come-first-served (FCFS) basis, and
   execute scheduling processing that controls execution timing of each of the multiple jobs such that respective jobs included in a specific job group of the plurality of job groups is implemented by priority over other job groups of the plurality of job groups, the specific job group being a job group including one or more jobs each of which is associated with a higher priority than respective jobs included in the other job groups,
   the controlling of the execution timing is performed such that an execution completion time of all the jobs included in the specific job group satisfies a predetermined condition, regardless of differences among priorities of all the jobs included in the specific job group.

2. The information processing apparatus according to claim 1, wherein the controlling of the execution timing of each of the multiple jobs is performed by selecting, for each of the multiple jobs, a schedule in which the execution completion time of all the jobs included in the specific job group is the earliest.

3. The information processing apparatus according to claim 1, wherein the controlling of the execution timing of each of the multiple jobs is performed by selecting, for each of the multiple jobs, a schedule in which the execution completion time of all the jobs included in the specific job groups is earlier than an execution completion time of all the respective jobs included in the other job groups.

4. The information processing apparatus according to claim 1, wherein
   the multiple jobs are executed in multiple nodes, and
   the processor further configured to:
   specify, for each of the plurality of job groups, combinations of jobs that may be executed at the same time in the multiple nodes among the jobs included in each of the plurality of job groups,
   specify, for each of the plurality of job groups, a specific combination in which the number of nodes used to execute the jobs included in the respective combinations is the highest among the specific combinations of the jobs, and
   schedule the execution timings regarding the jobs included in each of the plurality of job groups by selecting, for each of the plurality of job groups, a schedule in which the respective jobs included in the specified specific combination are executed at the same time.

5. The information processing apparatus according to claim 1, wherein the processor performs a grouping the multiple jobs into sets of a predetermined number of jobs in descending order of priority.

6. The information processing apparatus according to claim 5, wherein the processor further configured to:
   respectively specify, after the multiple jobs are executed, for each set of the multiple jobs, durations from the execution start time of the job executed at the beginning in the job groups including the respective jobs to the execution start times of the respective jobs,
   calculate an average time of the durations corresponding to the jobs satisfying the predetermined condition among the multiple jobs, and
   redetermine, when the calculated average time exceeds a first threshold, the predetermined number such that the predetermined number indicates a lower value.

7. The information processing apparatus according to claim 6, wherein the processor calculates an average time of the durations corresponding to the jobs having the high priority among the multiple jobs.

8. The information processing apparatus according to claim 6, wherein the processor redetermines, when the calculated average time is below second threshold, the predetermined number such that the predetermined number indicates a value higher than the predetermined number.

9. A job scheduling method comprising:
   generating a plurality of job groups by grouping, in descending order of priority, multiple jobs of execution targets, each of the multiple jobs being associated with an individual priority from higher to lower based on a first-come-first-served (FCFS) basis; and
   executing scheduling processing that controls execution timing of each of the multiple jobs such that respective jobs included in a specific job group of the plurality of job groups is implemented by priority over other job groups of the plurality of job groups, the specific job group being a job group including one or more jobs each of which is associated with a higher priority than respective jobs included in the other job groups,
   the controlling of the execution timing is performed such that an execution completion time of all the jobs included in the specific job group satisfies a predetermined condition, regardless of differences among priorities of all the jobs included in the specific job group.

10. The job scheduling method according to claim 9, wherein the controlling of the execution timing of each of the multiple jobs is performed by selecting, for each of the multiple jobs, a schedule in which the execution completion time of all the jobs included in the specific job group is the earliest.

11. A non-transitory computer-readable storage medium storing a program that causes a processor included in a relay device in a communication system to execute a process, the process comprising:
   generating a plurality of job groups by grouping, in descending order of priority, multiple jobs of execution targets, each of the multiple jobs being associated with an individual priority from higher to lower based on a first-come-first-served (FCFS) basis; and
   executing scheduling processing that controls execution timing of each of the multiple jobs such that respective jobs included in a specific job group of the plurality of job groups is implemented by priority over other job groups of the plurality of job groups, the specific job group being a job group including one or more jobs each of which is associated with a higher priority than respective jobs included in the other job groups, the controlling of the execution timing is performed such that an execution completion time of all the jobs included in the specific job group satisfies a predetermined condition, regardless of differences among priorities of all the jobs included in the specific job group.

12. The non-transitory computer-readable storage medium according to claim 11, wherein the multiple jobs are executed in multiple nodes, and the scheduling includes scheduling the execution timings regarding the multiple jobs such that, when scheduling of an execution timing regarding a specific job included in the multiple jobs is performed, the execution timing of the specific job corresponds to an earliest time slot among time slots when the same number of nodes as the number of nodes used to execute the specific job may be used.

* * * * *